US009127127B2

(12) United States Patent
Guggenheim et al.

(10) Patent No.: US 9,127,127 B2
(45) Date of Patent: Sep. 8, 2015

(54) POLYETHERIMIDE COMPOSITIONS, METHODS OF MANUFACTURE, AND ARTICLES FORMED THEREFROM

(71) Applicants: Thomas Link Guggenheim, Mt. Vernon, IN (US); Roy Ray Odle, Mt. Vernon, IN (US); Farid Fouad Khouri, Clifton Park, NY (US)

(72) Inventors: Thomas Link Guggenheim, Mt. Vernon, IN (US); Roy Ray Odle, Mt. Vernon, IN (US); Farid Fouad Khouri, Clifton Park, NY (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 266 days.

(21) Appl. No.: 13/649,443

(22) Filed: Oct. 11, 2012

(65) Prior Publication Data
US 2014/0094536 A1    Apr. 3, 2014

Related U.S. Application Data

(63) Continuation-in-part of application No. 13/644,167, filed on Oct. 3, 2012.

(51) Int. Cl.
*C08G 73/10*    (2006.01)

(52) U.S. Cl.
CPC ........ *C08G 73/1021* (2013.01); *C08G 73/1046* (2013.01); *C08G 73/1053* (2013.01); *C08G 73/1071* (2013.01)

(58) Field of Classification Search
CPC .................................. C08G 73/1007–73/1032
USPC .......................................................... 528/353
See application file for complete search history.

(56) References Cited

U.S. PATENT DOCUMENTS

| 3,383,092 A | 5/1968 | Cazier |
| 3,671,487 A | 6/1972 | Abolins |
| 3,723,373 A | 3/1973 | Lucas |
| 3,948,941 A | 4/1976 | Patton |
| 3,998,840 A | 12/1976 | Williams, III et al. |

(Continued)

FOREIGN PATENT DOCUMENTS

| EP | 0054426 A2 | 6/1982 |
| EP | 0235388 A2 | 9/1987 |

(Continued)

OTHER PUBLICATIONS

International Search Report for International Application No. PCT/US2013/063240, International Application Filing Date Oct. 3, 2013, Date of Mailing Dec. 18, 2013, 4 pages.

(Continued)

*Primary Examiner* — Rachel Kahn
(74) *Attorney, Agent, or Firm* — Cantor Colburn LLP; Diderico van Eyl

(57) ABSTRACT

A method for the manufacture of a polyetherimide composition includes catalyzing the reaction of a dianhydride and an organic diamine with a catalyst selected from guanadinium salts, pyridinium salts, imidazolium salts, tetra($C_{6-24}$)aryl ammonium salts, tetra($C_{7-24}$ arylalkylene) ammonium salts, dialkyl heterocycloaliphatic ammonium salts, bis-alkyl quaternary ammonium salts, ($C_{7-24}$arylalkylene)($C_{1-16}$alkyl) phosphonium salts, ($C_{6-24}$aryl)($C_{1-16}$alkyl)phosphonium salts, phosphazenium salts and combinations thereof, optionally in the presence of a solvent.

27 Claims, 6 Drawing Sheets

(56) References Cited

U.S. PATENT DOCUMENTS

| | | | |
|---|---|---|---|
| 4,065,433 A | 12/1977 | Muller et al. | |
| 4,066,621 A | 1/1978 | Muller | |
| 4,073,773 A | 2/1978 | Banucci et al. | |
| 4,100,140 A | 7/1978 | Zahir et al. | |
| 4,273,712 A | 6/1981 | Williams, III | |
| 4,324,882 A | 4/1982 | Takekoshi | |
| 4,324,883 A | 4/1982 | White et al. | |
| 4,324,884 A | 4/1982 | White et al. | |
| 4,324,885 A | 4/1982 | White et al. | |
| 4,460,778 A | 7/1984 | Brunelle | |
| 4,554,357 A | 11/1985 | Verbicky, Jr. et al. | |
| 4,577,033 A | 3/1986 | Verbicky, Jr. et al. | |
| 4,595,760 A | 6/1986 | Brunelle | |
| 4,681,949 A | 7/1987 | Brunelle | |
| 4,785,069 A | 11/1988 | Kouno et al. | |
| 4,870,155 A | 9/1989 | Matzner et al. | |
| 5,068,357 A | 11/1991 | Tsumura et al. | |
| 5,156,732 A | 10/1992 | Ogasawara et al. | |
| 5,189,128 A | 2/1993 | Maw et al. | |
| 5,219,580 A | 6/1993 | Torres et al. | |
| 5,229,482 A | 7/1993 | Brunelle | |
| 5,362,837 A | 11/1994 | Takekoshi et al. | |
| 5,438,114 A | 8/1995 | White et al. | |
| 5,514,813 A | 5/1996 | Brunelle | |
| 5,521,230 A | 5/1996 | Bhatia et al. | |
| 5,637,387 A | 6/1997 | Chin et al. | |
| 5,663,275 A | 9/1997 | Schmidhauser | |
| 5,688,902 A | 11/1997 | Bernard et al. | |
| 5,830,974 A | 11/1998 | Schmidhauser et al. | |
| 5,856,421 A | 1/1999 | Schmidhauser | |
| 5,907,025 A | 5/1999 | Brunelle | |
| 5,908,915 A | 6/1999 | Brunelle | |
| 5,969,086 A | 10/1999 | Webb et al. | |
| 6,066,743 A | 5/2000 | Nick et al. | |
| 6,096,900 A | 8/2000 | Nick et al. | |
| 6,235,866 B1 | 5/2001 | Khouri et al. | |
| 6,251,354 B1 | 6/2001 | Greenwell et al. | |
| 6,265,521 B1 | 7/2001 | Fyvie et al. | |
| 6,365,710 B1 | 4/2002 | Wang et al. | |
| 6,570,038 B1 | 5/2003 | Caringi et al. | |
| 6,630,568 B1 | 10/2003 | Johnson et al. | |
| 6,790,263 B1 | 9/2004 | Ding et al. | |
| 6,790,934 B2 | 9/2004 | Johnson et al. | |
| 6,849,706 B1 | 2/2005 | Brunelle et al. | |
| 6,919,418 B2 | 7/2005 | Khouri et al. | |
| 6,949,622 B2 | 9/2005 | Silvi et al. | |
| 7,071,282 B2 | 7/2006 | Acar et al. | |
| 7,115,785 B2 | 10/2006 | Guggenheim et al. | |
| 7,122,619 B2 | 10/2006 | Silvi et al. | |
| 7,125,954 B2 | 10/2006 | Guggenheim et al. | |
| 7,226,989 B2 | 6/2007 | Silvi et al. | |
| 7,481,959 B2 | 1/2009 | Richards et al. | |
| 7,495,113 B2 | 2/2009 | Pressman et al. | |
| 7,605,222 B2 | 10/2009 | Ye et al. | |
| 7,714,095 B2 | 5/2010 | Brunelle et al. | |
| 7,772,435 B2 | 8/2010 | Guggenheim et al. | |
| 7,842,188 B2 | 11/2010 | Hall et al. | |
| 7,902,407 B2 | 3/2011 | Silva et al. | |
| 8,274,744 B2 | 9/2012 | Haralur et al. | |
| 8,372,941 B2 | 2/2013 | Bernabe et al. | |
| 2004/0249117 A1* | 12/2004 | Acar et al. | 528/353 |
| 2006/0004180 A1 | 1/2006 | Itatani | |
| 2006/0135741 A1 | 6/2006 | Gui et al. | |
| 2007/0073035 A1* | 3/2007 | Stella et al. | 528/350 |
| 2007/0093667 A1 | 4/2007 | Watanabe et al. | |
| 2009/0163691 A1 | 6/2009 | Bernabe et al. | |
| 2011/0263791 A1 | 10/2011 | Chiong et al. | |
| 2013/0053489 A1 | 2/2013 | Gallucci et al. | |
| 2013/0108851 A1 | 5/2013 | Kuhlman et al. | |
| 2014/0099510 A1 | 4/2014 | Chiong et al. | |

FOREIGN PATENT DOCUMENTS

| | | |
|---|---|---|
| EP | 0411461 A2 | 2/1991 |
| EP | 2644640 A1 | 10/2013 |
| EP | 2644641 A1 | 10/2013 |
| GB | 1217363 | 12/1970 |
| GB | 1487633 | 10/1977 |
| JP | 62126172 | 6/1987 |
| WO | 8806605 | 9/1988 |
| WO | 9304099 | 3/1993 |
| WO | 9602563 A1 | 2/1996 |
| WO | 9962894 | 12/1999 |
| WO | 2004035689 A1 | 4/2004 |
| WO | 2004067623 A2 | 8/2004 |
| WO | 2013063470 A1 | 5/2013 |

OTHER PUBLICATIONS

Written Opinion for International Application No. PCT/US2013/063240, International Application Filing Date Oct. 3, 2013, Date of Mailing Dec. 18, 2013, 3 pages.

International Preliminary Report on Patentability for International Application No. PCT/US2013/063240, International Application Filing Date Oct. 3, 2013, Date of Report Apr. 7, 2015, 4 pages.

JP10139753 A, Abstract Only, 1 page, May 26, 1998.

JP62126172 A, Jun. 8, 1987, Abstract Only, 1 page.

JP63273620 A, Nov. 10, 1988, Abstract Only, 1 page.

Sun et al., "Synthesis and properties of polyimides containing 2,2'-bipyridine derivatives", Macromolecular Chemistry and Physics, vol. 198, Issue 3, pp. 833-841, 1997.

* cited by examiner

POLYETHERIMIDE COMPOSITIONS, METHODS OF MANUFACTURE, AND ARTICLES FORMED THEREFROM

CROSS-REFERENCE TO RELATED APPLICATION

This application is a continuation-in-part of U.S. patent application Ser. No. 13/644,167, filed Oct. 3, 2012, which is incorporated herein by reference in its entirety.

BACKGROUND OF THE INVENTION

This disclosure relates to polyetherimides and compositions containing the polyetherimides, as well as their method of manufacture and articles formed from the polyetherimide compositions.

Polyetherimides ("PEIs") are amorphous, transparent, high performance polymers having a glass transition temperature ("Tg") of greater than 180° C. Polyetherimides further have high strength, heat resistance, and modulus, and broad chemical resistance, and so are widely used in applications as diverse as automotive, telecommunication, aerospace, electrical/electronics, transportation, and healthcare.

Polyetherimides can be manufactured by polycondensation of a dianhydride with an organic diamine (polycondensation). An ongoing challenge associated with the polycondensation reaction is achieving high conversion of dianhydride and organic diamine to polyetherimide in a commercially useful reaction time. The rate of polycondensation can be increased by conducting the reaction at higher temperatures, but decomposition can occur or unwanted by-products can form. Alternatively, polycondensation can be conducted at a lower temperature in the presence of a catalyst. For example, U.S. Pat. No. 4,324,882 discloses sodium phenylphosphinate ("SPP") as a useful catalyst for the polycondensation reaction. However, the use of SPP, like the use of higher temperatures, can result in unwanted by-products that can adversely affect the physical properties of the polyetherimide. Moreover, the presence of residual SPP in the polyetherimide can adversely affect the hydrolytic stability of the polyetherimide under certain conditions.

Thus there remains a need in the art for an improved process for the manufacture of polyetherimides that does not result in decomposition or side reactions that can adversely affect the properties of the polyetherimides, for example hydrolytic stability. It would be a further advantage if such methods allowed the production of polyetherimides having reduced branching, as measured by the polydispersity index or by R*, and reduced color, as compared to prior art polyetherimides. A still further advantage would be scalability of the process to industrial production levels. It would also be advantageous if such methods were effective in providing polyetherimides in high yields within a commercially useful reaction time.

SUMMARY OF THE INVENTION

Disclosed herein is a method for the manufacture of a polyetherimide composition, the method comprising catalyzing the reaction of a dianhydride and an organic diamine with a catalyst selected from guanidinium salts, pyridinium salts, imidazolium salts, tetra($C_{6-24}$)aryl ammonium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl)phosphonium salts, ($C_{6-24}$aryl)($C_{1-16}$alkyl)phosphonium salts, phosphazenium salts, and combinations thereof, optionally in the presence of a solvent, to provide the polyetherimide composition comprising a residue of the catalyst and an polyetherimide; wherein
the dianhydride has a formula of

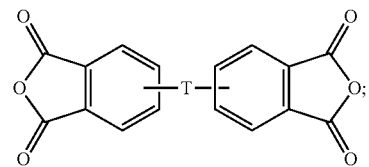

the diamine has a formula of

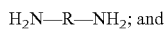

the polyetherimide has a formula of

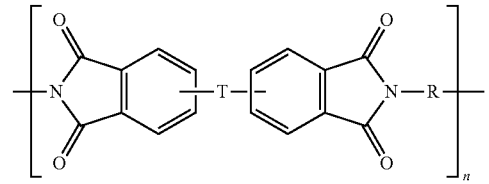

wherein in the forgoing formulae:
T is —O— or a group of the formula —O—Z—O—, wherein Z is an aromatic $C_{6-24}$ monocyclic or polycyclic moiety optionally substituted with 1 to 6 $C_{1-8}$ alkyl groups, 1 to 8 halogen atoms, or a combination thereof;
R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, a divalent group of the formula

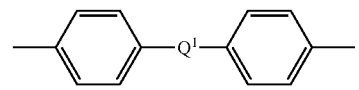

wherein $Q^1$ is selected from —O—, —S—, —C(O)—, —$SO_2$—, —SO—, and —$C_yH_{2y}$— and a halogenated derivative thereof wherein y is an integer from 1 to 5, and —$(C_6H_{10})_z$— wherein z is an integer from 1 to 4, and an aromatic hydrocarbyl moiety having from 1 to 6 aromatic groups; and
n is an integer greater than 1.

Also disclosed herein is a method for the manufacture of a polyetherimide composition, the method comprising catalyzing the reaction of a dianhydride and an organic diamine with a catalyst selected from guanidinium salts, pyridinium salts, imidazolium salts, tetra($C_{6-24}$)aryl ammonium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl)phosphonium salts, ($C_{6-24}$aryl)($C_{1-16}$alkyl) phosphonium salts, phosphazenium salts, and combinations thereof, optionally in the presence of a solvent, to provide the polyimide composition comprising a residue of the catalyst and a polyetherimide;

wherein
the dianhydride has a formula of

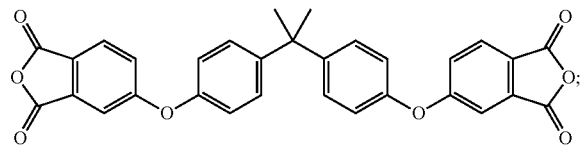 [SMILES: CC(C)(c1ccc(Oc2ccc3c(c2)C(=O)OC3=O)cc1)c1ccc(Oc2ccc3c(c2)C(=O)OC3=O)cc1]

the diamine has a formula of

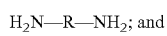

the polyetherimide has a formula of

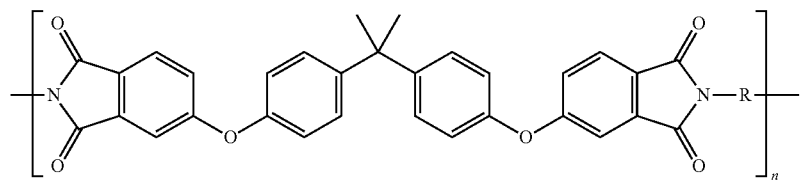

wherein in the forgoing formulae:
R is selected from

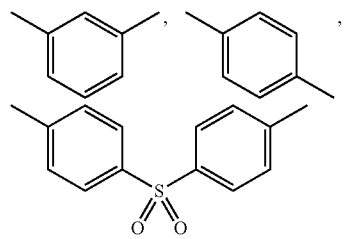

and combinations thereof; and
n is an integer greater than 1;
wherein the reaction of the dianhydride and the diamine is complete in less than or equal to 20 hours.

In another embodiment, disclosed herein is a polyetherimide composition comprising a polyetherimide of the formula

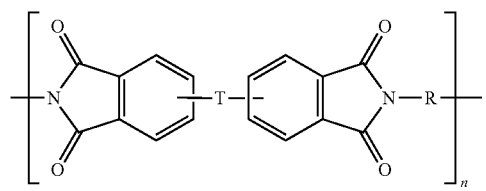

and
a residue of a catalyst selected from guanidinium salts, pyridinium salts, imidazolium salts, tetra($C_{6-24}$)aryl ammonium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl)phosphonium salts, ($C_{6-24}$aryl)($C_{1-16}$alkyl) phosphonium salts, phosphazenium salts, and combinations thereof;
the polyetherimide being a catalyzed reaction product of a dianhydride and an organic diamine catalyzed by the catalyst;

wherein
the dianhydride has a formula of

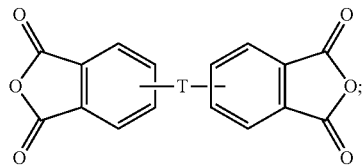

and
the diamine has a formula of $H_2N$—R—$NH_2$;

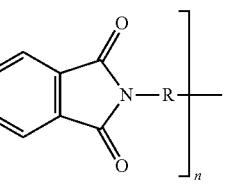

wherein in the forgoing formulae:
T is —O— or a group of the formula —O—Z—O—, wherein Z is an aromatic $C_{6-24}$ monocyclic or polycyclic moiety optionally substituted with 1 to 6 $C_{1-8}$ alkyl groups, 1 to 8 halogen atoms, or a combination thereof; and R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, a divalent group of the formula

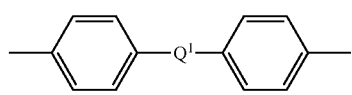

wherein $Q^1$ is selected from —O—, —S—, —C(O)—, —$SO_2$—, —SO—, and —$C_yH_{2y}$— and a halogenated derivative thereof wherein y is an integer from 1 to 5, and —($C_6$—$H_{10}$)$_z$— wherein z is an integer from 1 to 4, and an aromatic hydrocarbyl moiety having from 1 to 6 aromatic groups; and n is an integer greater than 1.

Articles comprising the above polyetherimide compositions are also disclosed.

A method of forming the above articles comprises shaping, extruding, blow molding, or injection molding the above polyetherimide compositions to form the articles.

Still further disclosed is a composition comprising a catalyst selected from guanidinium salts, pyridinium salts, imidazolium salts, tetra($C_{6-24}$)aryl ammonium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl)phosphonium salts, ($C_{6-24}$aryl)($C_{1-16}$alkyl)phosphonium salts, phosphazenium salts, and combinations thereof;

a dianhydride having a formula of

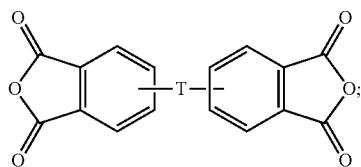

and
a diamine having a formula of

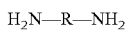

wherein in the forgoing formulae:
T is —O— or a group of the formula —O—Z—O—, wherein Z is an aromatic $C_{6-24}$ monocyclic or polycyclic moiety optionally substituted with 1 to 6 $C_{1-8}$ alkyl groups, 1 to 8 halogen atoms, or a combination thereof; and
R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, a divalent group of the formula

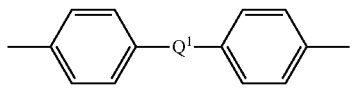

wherein $Q^1$ is selected from —O—, —S—, —C(O)—, —$SO_2$—, —SO—, and —$C_yH_{2y}$— and a halogenated derivative thereof wherein y is an integer from 1 to 5, and —$(C_6H_{10})_z$— wherein z is an integer from 1 to 4, and an aromatic hydrocarbyl moiety having from 1 to 6 aromatic groups.

The invention is further illustrated by the Drawings, Detailed Description, Examples, and Claims.

DETAILED DESCRIPTION OF THE INVENTION

Figure 1:
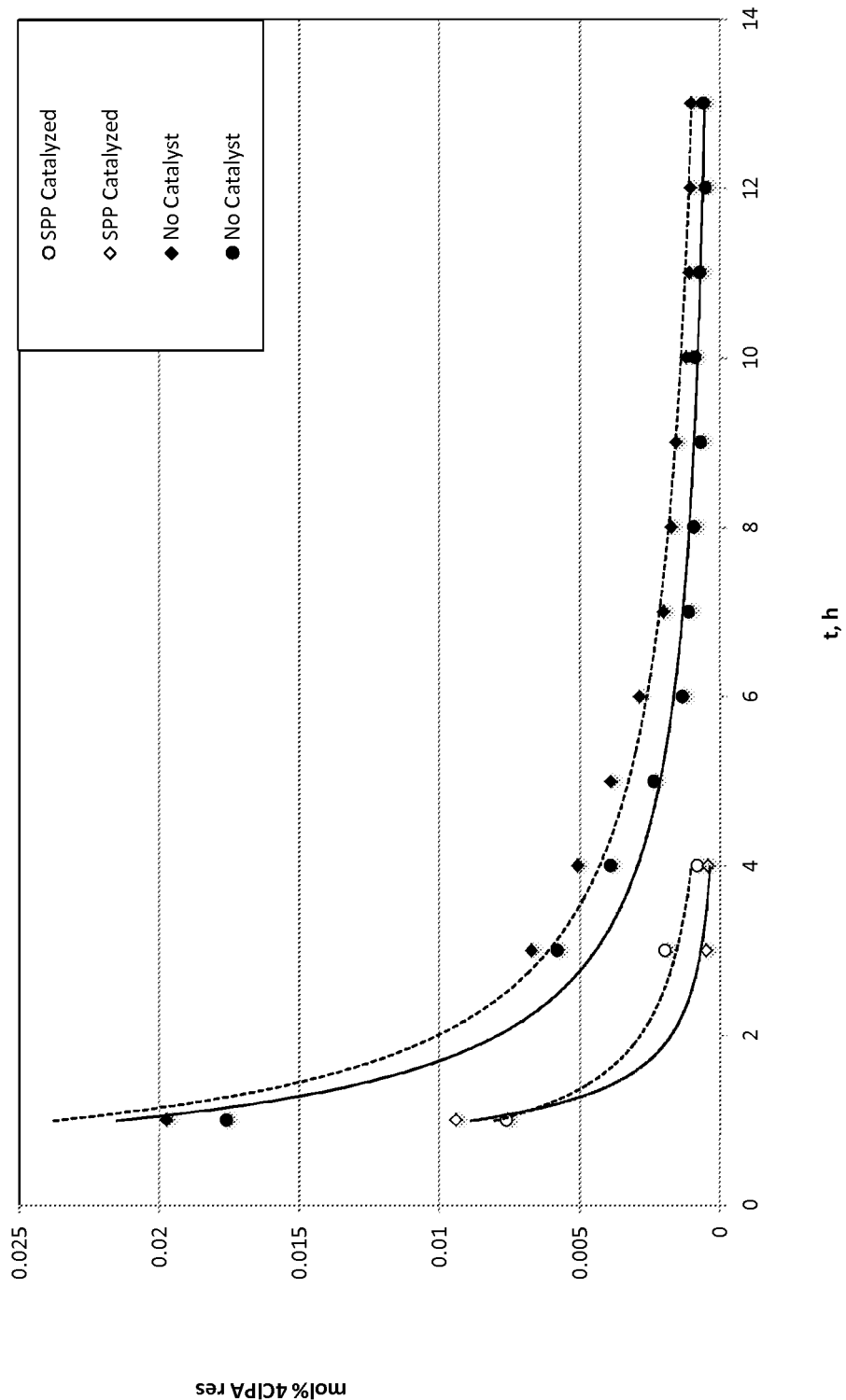
FIG. 1 is a graph showing residual 4-ClPA as a function of reaction times for uncatalyzed and SPP catalyzed bis(chlorophthalimide) monomer making reactions.

Our invention is based on the discovery that it is now possible to make polyetherimides having lower amount of by-products and hence improved properties, such as hydrolytic stability in an industrial setting. In particular, the inventors have discovered that reacting a dianhydride and an organic diamine in the presence of a catalyst of this disclosure is effective to provide polyetherimides in high yields within a commercially useful reaction time. The catalysts can be a guanidinium salt, a pyridinium salt, an imidazolium salt, a tetra($C_{7-24}$ arylalkylene)ammonium salt, a dialkyl heterocycloaliphatic ammonium salt, a bis-alkyl quaternary ammonium salt, a ($C_{7-24}$arylalkylene)($C_{1-16}$alkyl)phosphonium salt, a ($C_{6-24}$aryl)($C_{1-16}$alkyl)phosphonium salt, a phosphazenium salt, and combinations thereof. Use of the catalyst of this disclosure decreases or eliminates the decomposition and/or other side reactions that may lead to the formation of undesirable by-products adversely affecting the properties of the polyetherimides. In a still further advantage, the polyetherimides produced by the methods of this disclosure can exhibit improved hydrolytic stability. In particular, the polyetherimides exhibit improved melt flow rate retention and tensile strength retention upon aging under hydrolytic conditions. Moreover, the polyetherimides have good melt viscosity and an acceptable yellowness index.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same property are inclusive of the endpoint and independently combinable.

All molecular weights in this application refer to weight average molecular weights unless indicated otherwise. All such mentioned molecular weights are expressed in Daltons.

As used herein, the terms "a" and "an" do not denote a limitation of quantity, but rather denote the presence of at least one of the referenced item. "Or" means "and/or." The term "Combination thereof" is inclusive of one or more of the recited elements, optionally together with a like element not recited. Reference throughout the specification to "another embodiment," "an embodiment," "some embodiments," and so forth, means that a particular element (e.g., feature, structure, property, and/or characteristic) described in connection with the embodiment is included in at least one embodiment described herein, and can or cannot be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and n- and s-octyl. The term "aryl" means an aromatic moiety containing the specified number of carbon atoms, such as phenyl, tropone, indanyl, or naphthyl. The term "hydrocarbyl moiety" means a group comprising carbon and hydrogen, optionally further comprising 1 to 6 heteroatoms, for example, oxygen, nitrogen, halogen, silicon, sulfur, or a combination thereof.

All ASTM tests are based on the 2003 edition of the Annual Book of ASTM Standards unless otherwise indicated.

The polyetherimides produced by the methods disclosed herein are of formula (1)

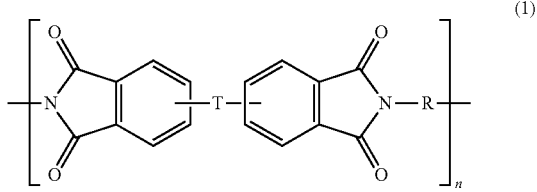

(1)

wherein n is greater than 1, for example 10 to 1,000 or more, or more specifically 10 to 500.

The group R in formula (1) is a $C_{6-27}$ aromatic hydrocarbon group or a halogenated derivative thereof, a straight or branched chain $C_{2-20}$ alkylene group or a halogenated derivative thereof, a $C_{3-20}$ cycloalkylene group or halogenated derivative thereof, or a divalent group of formula (2)

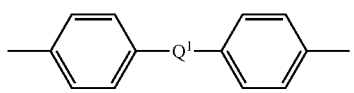

(2)

wherein $Q^1$ is selected from —O—, —S—, —C(O)—, —SO$_2$—, —SO—, —C$_y$H$_{2y}$— and a halogenated derivative thereof wherein y is an integer from 1 to 5, including perfluoroalkylene groups, or —(C$_6$H$_{10}$)$_z$— wherein z is an integer from 1 to 4, or an aromatic hydrocarbyl moiety having from 1 to 6 aromatic groups.

In an embodiment R is a divalent group of formulas (3)

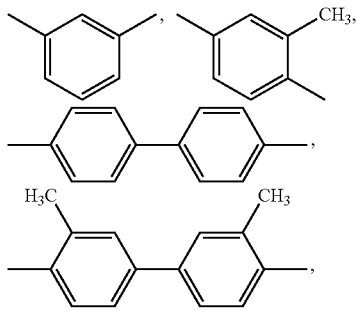

(3)

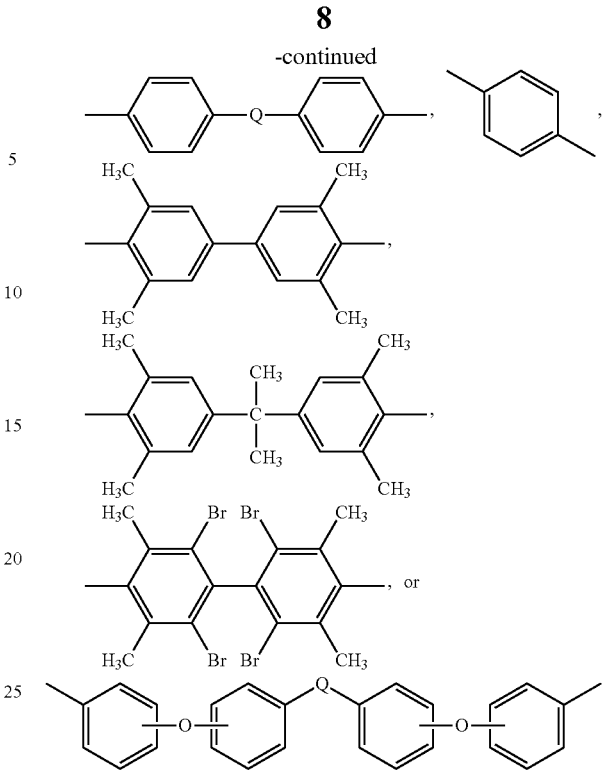

wherein $Q^1$ is —O—, —S—, —C(O)—, —SO$_2$—, —SO—, —C$_y$H$_{2y}$— wherein y is an integer from 1 to 5 or a halogenated derivative thereof, including perfluoroalkylene groups, or —(C$_6$H$_{10}$)$_z$— wherein z is an integer from 1 to 4. In some embodiments, R is the diether aromatic moiety of formula (3) having four phenylene groups wherein Q is a direct bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4. In some embodiments R is m-phenylene, p-phenylene, or diarylsulfone. The diarylsulfone can be, for example, 4,4'-diphenylsulfone.

The group T in formula (1) is —O— or a group of the formula —O—Z—O—, wherein Z is a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups of formula (4):

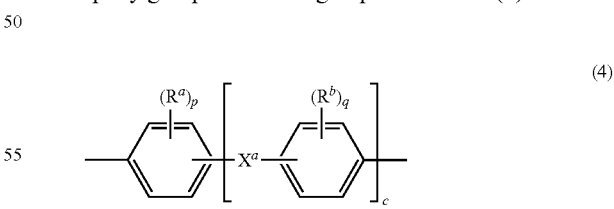

(4)

wherein $R^a$ and $R^b$ are each independently a halogen atom or a monovalent hydrocarbon group; p and q are each independently integers of 0 to 4; c is zero to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

(4a)

wherein Q is —O—, —S—, —C(O)—, —SO$_2$—, —SO—, and —C$_y$H$_{2y}$— and a halogenated derivative thereof wherein y is an integer from 1 to 5, including perfluoroalkylene groups. In a specific embodiment Q is 2,2-isopropylidene.

In another specific embodiment, the polyetherimide comprises more than 1, specifically 10 to 1,000, or more specifically, 10 to 500 structural units, of formula (1) wherein R is a divalent group of formula (2) wherein $Q^1$ is —C$_y$H$_{2y}$— or a halogenated derivative thereof wherein y is an integer from 1 to 5, and Z is a group of formulas (4a) wherein Q is —O—, —S—, —C(O)—, —SO$_2$—, —SO—, and —C$_y$H$_{2y}$— or a halogenated derivative thereof wherein y is an integer from 1 to 5. In some embodiments, R is m-phenylene, p-phenylene, diphenylsulfone, or a combination thereof, and Z is 2,2-(4-phenylene)isopropylidene. In some embodiments, the polyetherimide is a polyetherimide sulfone. A specific polyetherimide sulfone comprises structural units of formula (1) wherein at least 50 mole percent of the R groups are of formula (4a) wherein Q is —SO$_2$— and the remaining R groups are independently p-phenylene or m-phenylene or a combination comprising at least one of the foregoing; and Z is 2,2-(4-phenylene)isopropylidene.

The polyetherimides can optionally comprise additional structural imide units, for example imide units of formula (5)

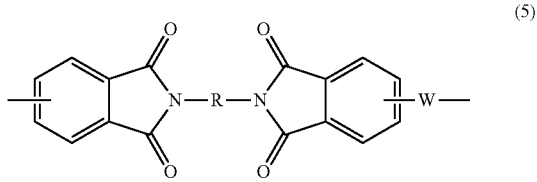

(5)

wherein R is as described in formula (1) and W is a linker of formulas (6).

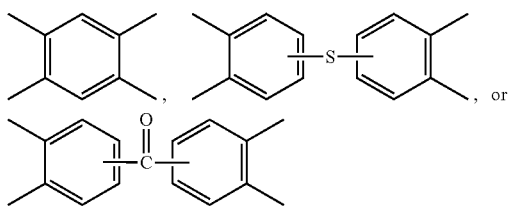

(6)

These additional structural imide units can be present in amounts ranging from 0 to 10 mole % of the total number of units, specifically 0 to 5 mole %, more specifically 0 to 2 mole %. In one embodiment no additional imide units are present in the polyetherimides.

The polyetherimides are prepared by catalyzing reaction of a dianhydride and an organic diamine (polycondensation) with a catalyst selected from guanidinium salts, pyridinium salts, imidazolium salts, tetra(C$_{7-24}$ arylalkylene)ammonium salts, dialkyl heterocycloaliphatic ammonium salts, bis-alkyl quaternary ammonium salts, (C$_{7-24}$arylalkylene)(C$_{1-16}$alkyl) phosphonium salts, (C$_{6-24}$aryl)(C$_{1-16}$alkyl) phosphonium salts, phosphazenium salts, and combinations thereof, optionally in the presence of a solvent. In this method, a dianhydride of formula (7)

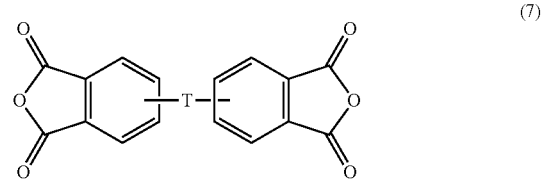

(7)

is condensed (imidized) with an organic diamine of formula (8)

H$_2$N—R—NH$_2$ (8)

wherein R is as described in formula (1), to form the polyetherimide of formula (1).

Illustrative examples of dianhydride (7) include 2,2-bis[4-(3,4-dicarboxyphenoxy)phenyl]propane dianhydride, the mixed dianhydride 2-[4-(3,4-dicarboxyphenoxy)phenyl]-2-[4-(2,3-dicarboxyphenoxy)phenyl]propane dianhydride, and 2,2-bis[4-(2,3-dicarboxyphenoxy)phenyl]propane dianhydride, respectively. Any mixture of the foregoing dianhydrides can also be used. In some embodiments a dianhydride composition comprising at least about 90 mole percent, and specifically at least about 95 mole percent 2,2-bis[4-(3,4-dicarboxyphenoxy)phenyl]propane dianhydride (BPADA), is employed in the synthesis of the polyetherimide composition. These dianhydrides can be obtained from the reaction of bisphenol A with a suitable phthalic anhydride derivative, such as for example, 4-chlorophthalic anhydride, 3-chlorophthalic anhydride, or mixtures thereof. Other illustrative examples of dianhydride (7) include 3,4,3',4'-benzophenonetetracarboxylic acid dianhydride, 3,3',4,4'-oxydiphthalic anhydride, 2,3,2',3'-biphenyltetracarboxylic acid dianhydride, pyromellitic dianhydride, 3,4,3',4'-diphenylsulfonetetracarboxylic acid dianhydride, 4,4'-bis(3,4-dicarboxyphenoxy)diphenyl sulfide dianhydride, 1,4-bis(3,4-dicarboxyphenoxy)benzene dianhydride, 4,4'-bis(3,4-dicarboxyphenoxy)diphenyl ether dianhydride, 2,2-bis(3,4-dicarboxyphenyl)hexafluoropropane dianhydride, and mixtures of the foregoing dianhydrides. In various embodiments, the polyetherimides comprise structural units derived from at least two dianhydrides described hereinabove. When at least two dianhydrides are selected, the relative amount of any two can be varied over a wide range, for example from a mole ratio of about 1:9 to about 9:1 in one embodiment, and from about 3:7 to about 7:3 in another embodiment.

Illustrative examples of organic diamines of formula (8) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl) toluene, bis (p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl) ether, 1,3-bis(3-aminopropyl)tetramethyldisiloxane, and 2-(4-aminophenyl)-5(6)-aminobenzimidazole. Illustrative examples of organic diamines of formula (8) containing sulfone groups include diamino diphenyl sulfone (DDS) and bis(aminophenoxy phenyl) sulfones (BAPS). Specific examples include meta-phenylenediamine (mPD), para-phenylenediamine (pPD), 2,4-diaminotoluene, 2,6-diaminotoluene, 2-methyl-4,6-diethyl-1,3-phenylenediamine, 5-methyl-4,6-diethyl-1,3-phenylenediamine, 1,3-diamino-4-isopropylbenzene, and 4,4'-diamino diphenyl sulfone. Combinations comprising any of the foregoing organic diamines can be used.

Specifically, organic diamine (8) is a meta-phenylene diamine (8a), a para-phenylene diamine (8b), or a diamino diaryl sulfone (8c)

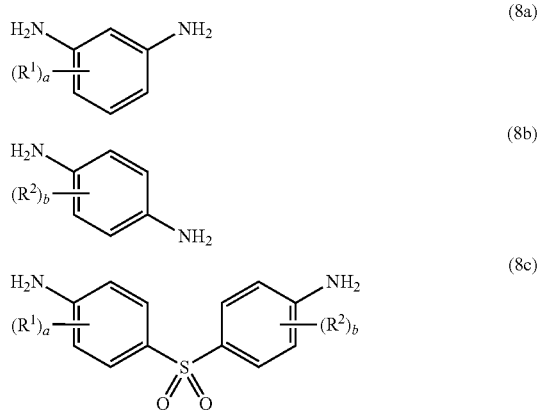

wherein $R^1$ and $R^2$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mDA), para-phenylenediamine (pDA), 2-methyl-4,6-diethyl-1,3-phenylenediamine, 5-methyl-4,6-diethyl-1,3-phenylenediamine, 1,3-diamino-4-isopropylbenzene, and 4,4'-diamino diphenyl sulfone.

Polycondensation of dianhydride (7) and organic diamine (8) (imidization) is conducted in the presence of a catalyst selected from guanidinium salts, pyridinium salts, imidazolium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl) phosphonium salts, ($C_{6-24}$aryl) ($C_{1-16}$alkyl) phosphonium salts, phosphazenium salts, and combinations thereof. The inventors have discovered that a catalyst of this disclosure, instead of a catalyst such as SPP, is highly effective in catalyzing the reaction of a dianhydride with an organic diamine to form a polyetherimide. In particular, the catalyst of this disclosure provides high levels of conversion in a commercially useful reaction time, and the process is scalable for industrial production. Use of the catalyst of this disclosure decreases or eliminates the decomposition and/or side reactions that can form undesirable byproducts that in turn can adversely affect the properties of the polyetherimide. In a still further advantage, the polyetherimides produced using the catalysts of this disclosure exhibit improved hydrolytic stability, in particular improved melt flow rate retention and tensile strength retention upon aging under hydrolytic conditions or thermal aging conditions. Moreover, the polyetherimides have reduced branching, as measured by the polydispersity index or by R*, and reduced color, as measured by yellowness index.

The imidization catalyst is selected from guanidinium salts, pyridinium salts, imidazolium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl) phosphonium salts, ($C_{6-24}$aryl)($C_{1-16}$alkyl)phosphonium salts, phosphazenium salts, and combinations thereof. A combination of different salts can be used. The foregoing salts include an anionic component, which is not particularly limited. Examples of anions include chloride, bromide, iodide, sulfate, phosphate, acetate, maculate, tosylate, and the like. A combination of different anions can be used. Salts are frequently referred to by the identity of the anion and as such the guanidinium, pyridinium or imidazolium salt may be a halide salt, nitrate salt, nitrite salt, boron-containing salt, antimony-containing salt, phosphate salt, carbonate salt, carboxylate salt or a combination of two or more of the foregoing.

Quaternary pyridinium salts include $C_{1-8}$alkyl pyridinium salts, N—($C_{1-10}$alkyl)-4-di($C_{1-10}$)alkylaminopyridinium salts, bis(($C_{1-12}$)alkyl pyridinium) salts.

Examples of N—($C_{1-10}$alkyl)-4-di($C_{1-10}$)alkylpyridinium salts include N-butyl-4-dimethylaminopyridinium chloride, N-2-ethylhexyl-4-dimethylaminopyridinium chloride, N-2-ethylexyl-4-methylpiperidinylpyridinium chloride, N-2-ethylhexyl-4-dibutylaminopyridinium chloride, N-2-ethylhexyl-4-dihexylaminopyridinium chloride, and N-neopentyl-4-dihexylaminopyridinium bromide. Examples of bis(($C_{1-12}$)alkyl pyridinium) salts include tetraethylene glycol bis-(4-dimethylaminopyridinium)bismethanesulfonate, 1,8-bis(4-dimethylaminopyridinium)octane dibromide, 1,6-bis(4-dihexylaminopyridinium)hexane dibromide, 1,8-bis(4-dihexylaminopyridinium)octane dibromide, and 1,10-bis(4-dihexylaminopyridinium)decane dibromide. Examples of ($C_{1-8}$)alkylimidazolium salts include 1-butyl-2,3-dimethylimidazolium chloride and 1-butyl-2,3-dimethylimidazolium tetrafluoroborate.

Dialkylaminopyridinium salts (14) can be used:

wherein $R^{20}$ and $R^{21}$ are hydrocarbyl groups having 1 to 13 carbons. The hydrocarbyl groups may be substituted or unsubstituted and branched or not branched. $R^{20}$ and $R^{21}$ together can form a cyclic hydrocarbyl group. $R^{22}$ is a linear or branched alkyl group having 4 to 12 carbons. $Y^-$ is as defined above.

Dialkylaminopyridinium salts (15) can also be used:

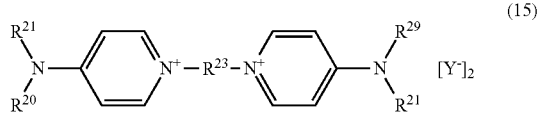
(15)

wherein $R^{20}$, $R^{21}$, and $Y^-$ are defined as above. $R^{23}$ is a linear hydrocarbyl having 4 to 25 carbon atoms.

Imidazolinium salts include $(C_{1-8})$alkylimidazolium salts, and benzimidazolium salts.

Guanidinium salts (12) can be used

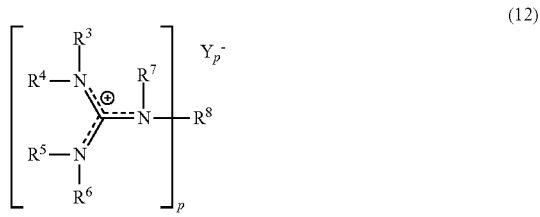
(12)

wherein each of $R^3$, $R^4$, $R^5$, $R^6$ and $R^7$ is a $C_{1-12}$ primary alkyl radical and $R^8$ is a $C_{1-12}$ primary alkyl or $C_{2-12}$ primary alkylene radical, or at least one of the $R^3$—$R^4$, $R^5$—$R^6$ and $R^7$—$R^8$ combinations with the connecting nitrogen atom forms a heterocyclic radical; $Y^-$ is an anion; and n is 1 or 2. The alkyl radicals suitable as $R^3$-$R^6$ include primary alkyl radicals, generally containing about 1-12 carbon atoms. $R^7$ is usually an alkyl radical of the same structure as $R^3$-$R^6$ or a $C_{2-12}$ alkylene radical in which the terminal carbons are primary; most preferably, it is $C_{2-6}$ alkyl or $C_{4-8}$ straight chain alkylene. Alternatively, any combination of $R^3$-$R^8$ and the corresponding nitrogen atom(s) may form a heterocyclic radical such as piperidino, pyrrolo, or morpholino. $Y^-$ can be any anion, for example the conjugate base of a strong acid. Specific examples of $Y^-$ are chloride, bromide, and methanesulfonate. The value of p is 1 or 2 depending on whether $R^7$ is alkyl or alkylene. Specific guanidinium salts include hexa$(C_{1-6})$alkylguanidinium and α,ω-bis(penta$C_{1-6}$)alkylguanidinium)$(C_{1-6})$alkane, and salts such as hexaethylguanidinium chloride, hexaethylguanidinium bromide, hexa-n-butylguanidinium bromide, and tris(piperidino)guanidinium bromide, 1,6-bis(N,N',N',N'',N''-penta-n-butylguanidinium) hexane dibromide and 1,6-bis(N-n-butyl-N',N',N''N''-tetraethylguanidinium)hexane dibromide.

Guanidinium salts include bis-guanidinium alkane salts of structure (13):

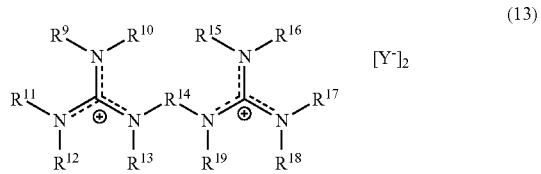
(13)

wherein $R^9$-$R^{13}$ and $R^{15}$-$R^{19}$ are each independently selected from the group comprising alkyl, cyclo alkyl, aryl, and aryl alkyl and have 1 to 20 carbons. $R^{14}$ is an alkylene group having 2 to 12 carbons, or, more specifically, 4 to 8 carbons. In some embodiments $R^9$-$R^{13}$ and $R^{15}$-$R^{19}$ are each independently alkyl groups having 1 to 12, or, more specifically, 2 to 6 carbons. In some embodiments $R^6$ is non-branched. $Y^-$ can be any suitable anion referred to in the preceding paragraph and in some embodiments is the anion of a strong acid such as chloride or bromide.

Dialkyl heterocycloaliphatic ammonium salts (16) can be used:

(16)

wherein $R^{24}$ and $R^{25}$ are each independently an alkyl groups having 1 to 4 carbons and n equals 4 to 6, o is an integer from 1 to 12, and $Y^-$ is defined as above.

Bis-alkyl quaternary ammonium salts (17) can be used:

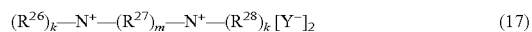
$(R^{26})_k$—$N^+$—$(R^{27})_m$—$N^+$—$(R^{28})_k$ $[Y^-]_2$ (17)

wherein $R^{26}$ and $R^{28}$ are each independently an alkyl having 1 to 12 carbons, each $R^{27}$ is a hydrocarbyl group having 1 to 12 carbons provided that all $R^{27}$ groups, taken together, have 4 to 12 carbons, k is an integer from 1 to 3, and m is 4-k provided that at least three of the $R^{26}$, $R^{27}$ and $R^{28}$ are aliphatic or alicyclic, and $Y^-$ is defined as above.

A catalytically active amount of the catalyst can be determined by one of skill in the art without undue experimentation, and can be, for example, more than 0 to 5 mole percent, specifically 0.01 to 2 mole percent, and more specifically 0.1 to 1.5 mole percent, and still more specifically 0.2 to 1.0 mole percent based on the moles of organic diamine (8). The catalyst for catalyzing the reaction of a dianhydride and a diamine can consist essentially, or consist of the foregoing guanadinium salts, pyridinium salts, imidazolium salts, tetra($C_{6-24}$) aryl ammonium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl) phosphonium salts, ($C_{6-24}$aryl)($C_{1-16}$alkyl)phosphonium salts, phosphazenium salts, and combinations thereof. In some embodiments, the produced polyetherimide compositions have less than 100 parts per million (ppm) by weight of the composition of a sodium aryl phosphinate salt, or no detectable amount of a sodium aryl phosphinate salt. As used herein, no detectable amount means that the amount is not detectable by HPLC that has a detection limit of 25 ppm.

Specifically, the catalyst for catalyzing the reaction of a bisanhydride and a diamine can consist essentially, or consist of a guanidinium salt, such as a hexaethylguanidinium salt. In some embodiments, these produced polyetherimide compositions have less than 100 ppm by weight of the polyetherimide composition of a sodium aryl phosphinate salt, or no detectable amount of a sodium aryl phosphinate salt. Guanidinium salts have enhanced stability over quaternary ammonium salts. Without being bound by theory, the delocalized nature of the positive charge (which is spread over the three nitrogen atoms and the carbon atom connecting them) is believed to stabilize the catalyst against decomposition at the reaction temperatures used, and thereby increase the effective amount for catalysis present throughout the reaction in comparison to quaternary ammonium salts. Also, a major decomposition pathway in quaternary ammonium salts is dehydroamination to form an amine and an olefin. For a guanidinium salt, the leaving group is a guanidine, a stronger base, and therefore a weaker leaving group, than the amine that is formed in the decomposition of quaternary ammonium salts. Thus decomposition of guanidinium salts is less energetically favored than decomposition of quaternary ammonium salts.

The catalyst can be added any time during the polycondensation reaction between the dianhydride and the organic diamine. For example, the catalyst can be added at the beginning of the reaction, at the end of the reaction, or anytime during the reaction. The catalyst can also be added continuously or in portions during the course of the reaction. In some embodiments, an amount of catalyst effective to catalyze the polycondensation of the dianhydride and the organic diamine can be added at the beginning of the reaction, for example about 0.2 mole %, based on the moles of the organic diamine, and an additional amount can be added at any time during the polycondensation reaction.

The polycondensation reaction can be conducted under either melt polymerization conditions or solution polymerization conditions.

In instances where melt polymerization is employed, the reaction is conducted in the absence of any organic solvent. Melt polymerization can be achieved in a melt extruder, as taught for example, by Mellinger et al. in U.S. Pat. No. 4,073,773.

In instances wherein solution polymerization is practiced, there can be utilized various organic solvents, for example relatively non-polar solvents, specifically with a boiling point above about 100° C., and more specifically above about 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned terms.

The polyetherimides (1) are generally prepared at a temperature of at least 110° C., specifically 150° C. to 275° C., more specifically 175° C. to 225° C. for solution polymerization. For melt polymerization, the temperature can be from 250° C. to 350° C. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation.

The reacting of the dianhydride (7) and the organic diamine (8) to form polyetherimide (1) is generally conducted for about 0.5 to about 30 hours, specifically about 1 to about 20 hours. Advantageously, the reaction is complete 20 hours or less. For example, the reaction is complete in 0.5 hour or less, 1 hour or less, 2 hours or less, 3 hours or less, 4 hours or less, 5 hours or less, 6 hours or less, 7 hours or less, 8 hours or less, 9 hours or less, 10 hours or less, 11 hours or less, 12 hours or less, 13 hours or less, 14 hours or less, 15 hours or less, 16 hours or less, 17 hours or less, 18 hours or less, 19 hours or less, 20 hours or less, 21 hours or less, 22 hours or less, 23 hours or less, 24 hours or less, 25 hours or less, 26 hours or less, 27 hours or less, 28 hours or less, 29 hours or less, or 30 hours or less.

The solvent, diamine (8) and dianhydride (7) can be combined in amounts such that the total solids content during the reaction to form polyetherimide (1) are 5 weight percent (wt %) to 70 wt %, specifically 10 wt % to 70 wt %, more specifically 20 wt % to 70 wt %. "Total solids content" expresses the proportion of the reactants as a percentage of the total weight including liquids present in the reaction at any given time. It can be desirable to have low water content in the reaction mixture. Thus, in some embodiments, the combined dianhydride, organic diamine, the catalyst and the solvent, if present, (reaction mixture) can comprise less than or equal to 200 parts per million parts of the combined components weight (ppm) of water, more specifically, less than or equal to 100 ppm of water, still more specifically, less than or equal to 50 ppm of water, or, yet more specifically, less than or equal to 25 ppm of water, based on the combined weight of dianhydride (7), organic diamine (8), the catalyst and the solvent, if present. In some embodiments, the reaction mixture comprises less than or equal to 100 ppm water. In other embodiments, water is removed in boiling solvents and the reaction mixture can comprise less than 5 wt % to 1 ppm of water depending on the reaction conditions and the point of the reaction.

A molar ratio of dianhydride (7) to diamine (8) of 0.9:1 to 1.1:1, more specifically about 1:1 can be used. While other ratios may be employed, a slight excess of dianhydride or diamine may be desirable. A proper stoichiometric balance between dianhydride (7) and diamine (8) is maintained to prevent undesirable by-products that can limit the molecular weight of the polymer, and/or result in polymers with amine end groups. Accordingly, in an embodiment, imidization proceeds adding diamine (8) to a mixture of dianhydride (7) and solvent to form a reaction mixture having a targeted initial molar ratio of dianhydride to diamine; heating the reaction mixture to a temperature of at least 100° C. (optionally in the presence of an imidization catalyst); analyzing the molar ratio of the heated reaction mixture to determine the actual initial molar ratio of dianhydride (7) to diamine (8); and, if necessary, adding dianhydride (7) or diamine (8) to the analyzed reaction mixture to adjust the molar ratio of dianhydride (7) to diamine (8) to 0.9:1 to 1.5:1.

In some embodiments, the polycondensation is conducted in the presence of an endcapping agent. Exemplary endcapping agents include, but are not limited to phthalic anhydride, aniline, C1-C18 linear, branched or cyclic aliphatic monoamines, and monofunctional aromatic amines of the formula

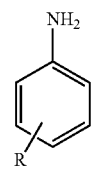

wherein R is a functional group, such as an amine or an anhydride providing reactivity for polymerization. If the endcapping agent is an amine, the amount of the endcapping agent added to the reaction mixture can be in the range of about 0-10 mole percent of the total amount of anhydride monomer. If, one the other hand, the endcapping agent is an anhydride, then the amount of the endcapping agent added to the reaction mixture can be in the range of about 0-10 mole percent of the amount of the amine monomer. The endcapping agent can be added at any time, e.g., to the diamine (8), the dianhydride (7), or a combination thereof, before or after the polycondensation reaction has started. In some embodiments, the endcapping agents are mixed with or dissolved into reactants having the similar functionality. For example, monoamine endcapping agents can be mixed with or dissolved into diamines, and monoanhydride can be mixed with or dissolved into dianhydrides. The polyetherimide composition comprises a residue of the catalyst. A residue of the catalyst as defined herein is that portion of the catalyst that remains in the polyetherimide composition after the polycondensation reaction. The residue of the catalyst can be the catalyst itself, a decomposition or reaction product of the catalyst, or combinations thereof. When the catalyst is a guanidinium salt, the guanidinium salt residue is readily removed from the polyetherimide composition. Thus, in some embodiments, a residue of the guanidinium salt is present in an amount less than 1000 ppm by weight, based on the weight of the polyetherimide composition. In other embodiments, for hot melt reactions, no residue of catalyst is left in the reaction mixture as the catalyst and/or the residue can devolatilize out of the melt extruder.

As described above, sodium aryl phosphinate salts such as sodium phenylphosphinate (SPP) are known in the art as catalysts for the preparation of polyetherimide (1). The inventive method for manufacture of the polyetherimide does not use a sodium aryl phosphinate salt. Thus the polyetherimide composition can have less than 100 ppm by weight of a sodium aryl phosphinate salt, based on the weight of the polyetherimide composition, specifically no detectable amount of a sodium aryl phosphinate salt.

As has been found by the inventors hereof, the catalysts of this disclosure provide high conversion of dianhydride (7), and organic diamine (8) to polyetherimide (1) in commercially useful reaction times, such that relatively low levels, or no, residual dianhydride (7), organic diamine (8) are present in polyetherimide (1). Thus, the polyetherimide composition can comprise a total amount of residual dianhydride (7) and organic diamine (8) combined of from 0 to an amount selected from less than or equal to 5 mole percent, 2 mole percent, 1 mole percent, 0.5 mole percent, 0.1 mole percent, 0.05, and 0.01 mole percent, based on moles of dianhydride (7) and organic diamine (8). Alternatively, the polyetherimide composition can comprise a total amount of residual dianhydride (7) and organic diamine (8) combined of from 0 to an amount selected from less than or equal to 10,000 ppm, for example less than or equal to the following: 5,000 ppm, 1000 ppm, 500 ppm, 250 ppm, 100 ppm, 50 ppm, 25 ppm, 0.5 ppm or 0.1 ppm, by weight, each based on the weight of the polyetherimide composition. The low level of residuals means that the polyetherimide composition comprising polyetherimide (1), dianhydride (7) and organic diamine (8) can be used without purification to remove or reduce the level of residual dianhydride (7), diamine (8), and monofunctional reactant. Alternatively, the polyetherimide composition can be subject to further purification as is known in the art.

Completion of the polycondensation reaction can be defined as the time after which no further increase in weight average molecular weight of the polyetherimide is observed. Advantageously, when the catalyst of this disclosure is utilized, the polycondensation reaction is complete in less than 30 hours, specifically less than 25 hours, more specifically less than 20 hours, and still more specifically less than 10 hours. For example, the reaction is complete in 0.5 hour or less, 1 hour or less, 2 hours or less, 3 hours or less, 4 hours or less, 5 hours or less, 6 hours or less, 7 hours or less, 8 hours or less, 9 hours or less, 10 hours or less, 11 hours or less, 12 hours or less, 13 hours or less, 14 hours or less, 15 hours or less, 16 hours or less, 17 hours or less, 18 hours or less, 19 hours or less, 20 hours or less, 21 hours or less, 22 hours or less, 23 hours or less, 24 hours or less, 25 hours or less, 26 hours or less, 27 hours or less, 28 hours or less, 29 hours or less, or 30 hours or less. In certain embodiments, the reaction mixture is taken to as high of Mw as possible in a set time, for example, 3 to 6 hours and the rest of the reaction is finished during devolitization of solvent in an apparatus like a wiped film evaporator or a devolatizing extruder Conducting the polycondensation as described above results in polyetherimide compositions with a number of advantageous properties.

The polyetherimide has physical properties that make it useful as a molding composition. For example, the polyetherimide can have an R* value that is less than or equal to 2.4, wherein R* is the ratio of viscosities measured under nitrogen at 1 rad/sec and 100 rad/sec at the temperature that gives a viscosity of 20,000 poise at 100 rad/sec.

The polyetherimide can have a yellowness index that is less than 120, measured on a 0.5 g solution of the polyetherimide in 10 mL of methylene chloride, and in accordance with ASTM E313.

The polyetherimide can have other physical properties that make it useful as a molding composition. For example, the polyetherimide can have a weight average molecular weight (Mw) of 5,000 to 100,000 grams per mole (g/mole) as measured by gel permeation chromatography (GPC). In some embodiments the Mw can be 10,000 to 80,000 g/mole. In other embodiments, the Mw can be 23,000 to 385,000. In the instance wherein the monomers are bisphenol A dianhydride and meta-phenylene diamine, the Mw of the prepared polyetherimide can be from 17,000 to 20,000. The molecular weights as used herein refer to the absolute weight averaged molecular weight (Mw).

The polyetherimide can have an intrinsic viscosity greater than or equal to 0.2 deciliters per gram (dL/g) as measured in m-cresol at 25° C. Within this range the intrinsic viscosity can be 0.35 to 1.0 dL/g, as measured in m-cresol at 25° C.

The polyetherimide can have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240 to 350° C.

The polyetherimide can have a melt index of 0.1 to 10 grams per minute (g/min), as measured by ASTM D1238 at 340 to 370° C., using a 6.7 kilogram (kg) weight.

The polyetherimide can be melt-mixed with other polymers, fillers, and/or additives ordinarily incorporated into polymer compositions of this type to form compositions having the desired properties, for example a molding composition, with the proviso that the polymers, fillers, and/or additives are selected so as to not significantly adversely affect the desired properties of the polyetherimide composition.

The polyetherimides can be formulated to provide a wide variety of polyetherimide compositions for the manufacture of articles. The polyetherimide compositions can optionally comprise a filler. In some instances it is desired to have polyetherimide compositions wherein a filler is substantially absent. "Substantially absent" means that the composition has less than 3 wt % of a filler, and in other embodiments less than 1 wt % filler by weight of the composition. In other instances, it is advantageous to have polyetherimide compositions wherein a filler is absent.

The filler can be a reinforcing filler, for example a flat, plate-like, and/or fibrous filler. Typically, the flat, plate-like filler has a length and width at least ten times greater than its thickness, where the thickness is from 1 to 1000 micrometers. Exemplary reinforcing fillers of this type include glass flakes, mica, flaked silicon carbide, aluminum diboride, aluminum flakes, and steel flakes; wollastonite including surface-treated wollastonite; calcium carbonate including chalk, limestone, marble and synthetic, precipitated calcium carbonates, generally in the form of a ground particulates; talc, including fibrous, modular, needle shaped, and lamellar talc; kaolin, including hard, soft, calcined kaolin, and kaolin comprising various coatings known in the art to facilitate compatibility with the polymeric matrix resin; mica; and feldspar.

Exemplary reinforcing fillers also include fibrous fillers such as short inorganic fibers, natural mineral fibrous fillers, single crystal fibers, glass fibers, ceramic fibers and organic reinforcing fibrous fillers. Short inorganic fibers include borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, including glass fibers such as E, ECR, S, and NE glasses and quartz, and the like can also be used.

Such reinforcing fillers can be provided in the form of monofilament or multifilament fibers and can be used either alone or in combination with other types of fiber, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, preforms and braids.

The reinforcing fibers can have a diameter of 5 to 25 micrometers, specifically diameters of 9 to 15 micrometers. In preparing molding compositions it is convenient to use reinforcing fibers such as fiberglass in the form of chopped strands of from 3 millimeters to 15 millimeters long. In articles molded from these compositions, on the other hand, shorter lengths will typically be encountered because during compounding considerable fragmentation can occur. Combinations of rigid fibrous fillers with flat, plate-like fillers can be used, for example to reduce warp of a molded article.

In some applications it can be desirable to treat the surface of the filler with a chemical coupling agent to improve adhesion to a thermoplastic resin in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the polyetherimide composition can vary widely, and is that amount effective to provide the desired physical properties and flame resistance. In some instances the reinforcing filler is present in an amount from more than 10 to 60 wt %, 15 to 40 wt %, 10 to 20 wt %, or 20 to 35 wt % each based on the total weight of the composition.

The polyetherimide composition can optionally further comprise one or more other types of particulate fillers, which includes nanosized fillers. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and combinations thereof. All of the above fillers can be surface treated with silanes to improve adhesion and dispersion with the polymeric matrix resin. When present, the amount of additional particulate filler in the polyetherimide composition can vary widely, and is that amount effective to provide the desired physical properties and flame resistance. In some instances the particulate filler is present in an amount from 1 to 80 wt %, specifically 5 to 30 wt %, more specifically 5 to 20 wt %, each based on the total weight of the composition. Alternatively, in some embodiments, our compositions do not contain appreciable amounts of fillers and in some embodiments, there are no detectable amounts of fillers, i.e., fillers are substantially absent or absent from the compositions. Accordingly, in some instances, the filler is present in an amount from 0 wt % to an amount that is less than or equal to an amount selected from 80 wt %, 75 wt %, 70 wt %, 65 wt %, 60 wt %, 55 wt %, 50 wt %, 45 wt %, 40 wt %, 35 wt %, 30 wt %, 25 wt %, 20, 15 wt %, 10 wt %, 5 wt %, and 1 wt %, each based on the total weight of the composition.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. In some embodiments, the polyetherimide composition comprises a solvent, and the composition is in the form of a varnish. Combinations of additives can be used, for example a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt %, specifically 0.01 to 10 wt %, based on the total weight of the composition. Alternatively, in some embodiments, our compositions do not contain appreciable amounts of additives, and in some embodiments, there are no detectable amounts of additives, i.e., additives are substantially absent or absent from the compositions. Accordingly, the foregoing additives (except any fillers) can be present in an amount from 0 to less than or equal to an amount selected from 20 wt %, 19 wt % 18 wt %, 17 wt %, 16 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, 0.5%, 0.3%, 0.1%, 0.01%, 0.001% and 0.0001 wt %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be used. Preferred stabilizers can have a molecular weight greater than or equal to 300. Some exemplary compounds are tris-di-tert-butylphenyl phosphite available from Ciba Chemical Co. as IRGAPHOS 168 and bis(2,4-dicumylphenyl)pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organophosphorous compounds can be of the same type or different types. For example, a combination can comprise two phosphite or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt %, specifically 0.01 to 1.0 wt %, based on total weight of the composition.

Hindered phenols can also be used as antioxidants, for example alkylated monophenols, and alkylated bisphenols or polyphenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha,alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt %, specifically 0.01 to 1.0 wt %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene and similar polyolefin homopolymers and copolymers can also be used a mold release agents. Mold release agents are typically present in the composition at 0.05 to 10 wt %, based on total weight of the composition, specifically 0.1 to 5 wt %. Preferred mold release agents will have high molecular weight, typically greater than 300, to prevent loss of the release agent from the molten polymer mixture during melt processing.

In particular, an optional polyolefin can be added to modify the chemical resistance characteristics and mold release characteristics of the polyetherimide composition. Homopolymers such as polyethylene, polypropylene, polybutene can be used either separately or in combination. Polyethylene can be added as high-density polyethylene (HDPE), low-density polyethylene (LDPE) or branched polyethylene. Polyolefins can also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt %, specifically 0.1 to 8 wt %, more specifically from 0.5 to 5 wt %, all based on the total weight of the polyetherimide composition.

In some embodiments, the polyetherimide composition can further include at least one additional polymer. Examples of such additional polymers include and are not limited to PPSU (polyphenylene sulfone), polyetherimides, PSU (polysulfone), PPE (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole), PAI (poly(amide-imide)), poly(ether sulfone), poly(aryl sulfone), polyphenylene, polybenzoxazoles, polybenzthiazoles, as well as blends and co-polymers thereof. When present, the polymer is used in an amount from more than 0 to 20 wt %, specifically 0.1 to 15 wt %, and more specifically from 0.5 to 10 wt %, all based on the total weight of the polyetherimide composition. In some embodiments, no polymer other than the polyetherimide as described herein is present in the polyetherimide composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt %, specifically 0 to 5 wt %, based on the total weight of the composition. In some instances, where improved impact is desired pigments such as titanium dioxide will have a mean particle size of less than 5 microns.

The polyetherimide composition can also optionally include a fluoropolymer in an effective amount to provide anti-drip or other beneficial properties to the resin composition. In one instance the fluoropolymer is present in an amount 0.01 to 5.0 wt % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Copolymers comprising structural units derived from two or more fluorinated alpha-olefin monomers can also be used, for example poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene)homopolymer (PTFE) preferred.

The fluoropolymer can be pre-blended in some manner with a polymer such as an aromatic polycarbonate or polyimide resin. For example, an aqueous dispersion of fluoropolymer and a polycarbonate resin can be steam precipitated to form a fluoropolymer concentrate for use as a drip inhibitor additive in thermoplastic resin compositions, as disclosed, for example, in U.S. Pat. No. 5,521,230. Alternatively, the fluoropolymer can be encapsulated.

In some instances it is desired to have polyetherimide compositions that are essentially free of bromine and chlorine. "Essentially free" of bromine and chlorine means that the composition has less than 3 wt % of bromine and chlorine, and in other embodiments less than 1 wt % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen per million parts by weight of the total polyetherimide composition (ppm). The amount of halogen can be determined by ordinary chemical analysis such as atomic absorption.

The polyetherimide composition can be prepared by blending the ingredients under conditions for the formation of an intimate blend. Such conditions often include melt mixing in single or twin screw-type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide composition prior to melt mixing. The melt mixing is often done at 290 to 340° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

In an exemplary process, the polyetherimide, any other polymers, and any additives are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The polyetherimide composition can be formed into an article by any number of methods including shaping, extruding (including profile extrusion), thermoforming, and molding, including injection molding, compression molding, gas assist molding, structural foam molding, and blow molding. In some embodiments, a method of forming an article comprises shaping, extruding, blow molding, or injection molding the composition to form the article. The polyetherimide compositions can also formed into articles using thermoplastic processes such as film extrusion, sheet extrusion, melt casting, blown film extrusion, and calendaring. Co-extrusion and lamination processes can be used to form composite multi-layer films or sheets. The article is selected from a sheet, film, multilayer sheet, multilayer film, molded part, extruded profile, coated part, pellets, powder, foam, fiber, fibrids, flaked fibers, and combinations thereof.

The polyetherimide composition can be molded into an article with any equipment conventionally used for molding thermoplastic compositions, such as a Newbury or van Dorn type injection-molding machine with conventional cylinder temperatures of 250° C. to 320° C., and conventional mold temperatures of 55° C. to 120° C.

The polyetherimide composition exhibits improved hydrolytic stability. (The term "hydrostable" as used herein, means "hydrolytically stable.") In some embodiments, when the polyetherimide composition is exposed to a temperature of 110° C. for 10 days under steam and under pressure, the composition has a melt flow rate increase that is less than 100% greater than a melt flow rate of the composition at 0 days steam and pressure exposure. Melt flow can be measured at 295° C. and a load of 6.7 kg according to ASTM D1238-10.

The polyetherimide composition exhibits improved Relative Thermal Index, a known property that indicates how a polymer's properties degrade after being subjected to heat aging. Materials are investigated with respect to retention of certain critical properties (e.g., dielectric strength, flammability, impact strength, and tensile strength) as part of a long-term thermal-aging program conducted in accordance with Underwriters Laboratories, Inc. Standard for Polymeric Materials-Long Term Property Evaluations (UL746B). The end-of-life of a material at each test temperature in this program has been assumed to be the time when the value of the critical property has decreased to 50% of its original (as received) value. Advantageously, the polyetherimide prepared in accordance with the process of the disclosure has a Relative Thermal Index (RTI) that is greater than or equal to 170° C., as determined by Underwriting Laboratories (UL® protocol UL746B).

In some embodiments, the polyetherimide composition retains at least 60% of its initial tensile strength, after exposure to 110° C. steam for 20 days. The initial tensile strength of the composition at yield can be from 9 to 15 MPa. Tensile strength can be measured according to ASTM D638-10. In some embodiments, the improved hydrolytic stability is obtained when the polyetherimide composition comprises less than 100 ppm by weight, based on the weight of the polyetherimide composition of a sodium aryl phosphinate salt.

The polyetherimide composition can exhibit a number of other advantageous physical properties. In some embodiments the polyetherimide composition has a melt viscosity of 50 to 20,000 Pascal-seconds, specifically 100 to 15,000 Pascal-seconds, or more specifically, 200 to 10,000 Pascal-seconds at 380° C. as measured by ASTM method D3835 using a capillary rheometer with a shear rate of 100 to 10,000 1/sec.

In another embodiment, the polyetherimide composition can have a heat deflection temperature (HDT) of greater than or equal to 120° C., specifically 170° C. to 400° C., measured according to ASTM D648 on a 3.2 mm bar at 0.46 MPa (66 psi).

The polyetherimide composition can have a melt flow rate (MFR) at 360° C. of greater than 10 grams per 10 minutes, when measured in accordance with ASTM D1238 at 295° C. using a load of 6.7 kg.

Because the polyetherimide compositions have improved hydrolytic stability, they are useful in many applications that require toughness and clarity after exposure to hot water or steam. Examples of applications include: food service, medical, lighting, lenses, sight glasses, windows, enclosures, safety shields, and the like. The high melt flow of the polyetherimide composition allows it to be molded into intricate parts with complex shapes and/or thin sections and requiring long polymer melt flow lengths. Examples of articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels. The polyetherimide compositions can also be made into film and sheet as well as components of laminate systems.

Without further elaboration, it is believed that one skilled in the art can, using the description herein, utilize the present invention. The following examples are included to provide additional guidance to those skilled in the art of practicing the claims. Accordingly, these examples are not intended to limit the invention in any manner.

EXAMPLES

Materials

The materials in Table 1 were used or made in the following Examples and Comparative Examples.

TABLE 1

| Acronym | Description | Source |
| --- | --- | --- |
| PA | Phthalic anhydride | |
| 3-ClPA | 3-Chlorophthalic anhydride | SABIC |
| 4-ClPA | 4-Chlorophthalic anhydride | SABIC |
| ClPA | Mixture of 3-chlorophthalic anhydride and 4-chlorophthalic anhydride | SABIC |
| ClPAMI | 1,3-bis[N-(4-chlorophthalimido)]benzene | Examples |
| Mono-ClPAMI (MA) | Mixture of 1-amino-3-N-(4-chlorophthalimido)benzene, 1-amino-3-N-(3-chlorophthalimido)benzene | Examples |
| mPD | meta-Phenylene diamine | DuPont |
| DDA | 4,4'-diaminodiphenyl sulfone | Atul |
| BPA | 2,2-Bis(4-hydroxyphenyl)propane, (Bisphenol A) | Hexion |
| BPANa$_2$ | Bisphenol, disodium salt | SABIC |
| BPADA | Bisphenol A dianhydride | SABIC |
| PCP | para-Cumyl phenol | SABIC |
| PEI | Polyetherimide | Examples |
| o-DCB | ortho-Dichlorobenzene | Fischer |
| HEGCl | Hexaethylguanidinium chloride | Atul Ltd. |
| SPP | Sodium phenylphosphinate | Akzo |
| TPPBr | Tetraphenylphosphonium bromide | Sigma-Aldrich |
| C6B | 1,6-Bis(tributylammonium)-hexane dibromide | Sigma-Aldrich |
| PyrEHCl | 4-(N,N-dimethyl)-2-ethylhexylpyridinium chloride | Sigma-Aldrich |
| TBAB | Tetrabutylammonium bromide | Sigma-Aldrich |
| 18-C-6 | 1,4,7,10,13,16-Hexaoxacyclooctadecane | Sigma-Aldrich |
| TTPCl | Trihexyltetradecylphosphonium chloride | Sigma-Aldrich |
| BDMICl | 1-butyl-2,3-dimethylimidazolium chloride | Sigma-Aldrich |
| H$_3$PO$_4$ | Phosphoric acid | Fischer |
| IRGAPHOS 168 | Tris(2,4-di-tert-butylphenyl)phosphite | CIBA Specialty Chemicals |

Property Testing

Weight average molecular weight (Mw) of the polymer product was determined by gel permeation chromatography (GPC) using polystyrene standards.

The weight average molecular weight (Mw), polydispersity indices PDI and PDI* were determined by gel permeation chromatography (GPC) using a Mixed Bed C, PLgel 5 µm, 300×7.5 mm, P/N 1110-6500 column, methylene chloride as eluent at 1 mL/min, UV detection at 254 nm, and a GPC calculation software program. PDI is Mw/Mn, wherein Mn is the number average molecular weight. PDI* is Mz/Mw, wherein Mz is the z-average molecular weight.

Residual ClPAMI, mono-ClPAMI, and PAMI contents were determined by high pressure liquid chromatography (HPLC). The detection limit was 25 ppm.

Residual chlorine was measured by total ion chromatography combustion and/or hexylamine digestion.

Polymer end groups were identified and quantitated by derivatization with a phosphorylation reagent, followed by phosphorous-31 nuclear magnetic resonance spectroscopy ($^{31}$P-NMR).

Water (moisture) content of reaction mixtures was determined by Karl-Fisher titration.

The shear thinning behavior of the polyetherimides was assessed by measurement of R* by parallel plate rheometry using a Rheometric Scientific ARES instrument equipped with 25 mm parallel plates. R* is a measure of shear thinning behavior of the polymer. It is calculated as the ratio of viscosities measured at 1 rad/sec and 100 rad/sec at a fixed temperature (the R* temperature) under nitrogen. The R* temperature is defined as the temperature that gives a viscosity of 20,000 poise at 100 rad/sec, under nitrogen. This temperature is typically between 310 and 345° C., depending on the molecular weight of the material. The method is based upon, but is not in full compliance with, ASTM D4440-01. All samples are vacuum dried at 150° C. for at least 4 hours before measurement.

Yellowness Index (YI) was measured according to ASTM E313. ASTM D-1925 is also an acceptable method. Generally, the YI is a number calculated from spectrophotometric data that describes the color of a test sample as being clear or white (low YI) versus being more yellow (high YI). Sample handling and preparation can affect the test results. The yellowness index of the polyetherimide polymer pellets was determined by dissolving 0.5 grams of polyetherimide pellets in 10 mL of methylene chloride, and measuring the YI of the resulting solution on an Xrite 7000 Color Eye device (Xrite, Incorporated) in accordance with ASTM E313.

Melt flow rate was measured at 295° C. and a load of 6.7 kg according to ASTM D1238-10.

Initial tensile strength at yield was measured according to ASTM D638-10.

Where indicated, "dry o-DCB" having moisture content of less than 10 ppm was used in the reactions. The dry o-DCB was kept in a glove box over 4-Angstrom molecular sieves.

BPANa$_2$

BPANa$_2$ was obtained by mixing sodium hydroxide with bisphenol A in a molar ratio of 2:1 at 70° C. in demineralized water under nitrogen. A solution was formed first. Then the solution was added slowly to boiling o-DCB in a reactor equipped with a Dean Stark condenser until all the salt was suspended in o-DCB. Water was eliminated to a moisture content of less than 20 ppm. The o-DCB was then removed using a rotary evaporator followed by Kugelrohr vacuum distillation at 250° C. under nitrogen to yield a white solid being BPANa$_2$. The white solid obtained was kept in a nitrogen glove box to prevent rehydration and oxidation.

Comparative Examples 1 and 4 and Examples 2, 3, and 5

The purpose of these examples was to evaluate catalysts used on our invention in polycondensation polymerization processes.

Comparative Example 1 and Examples 2-3

These examples demonstrate the use of HEGCl as an effective catalyst for the polymerization of DDS and BPADA to form a polyetherimide, as indicated below:

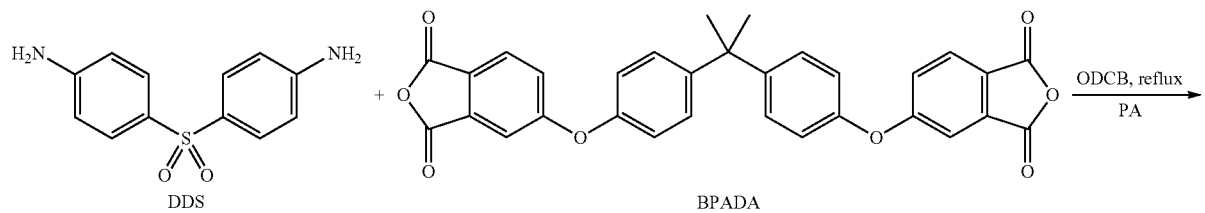

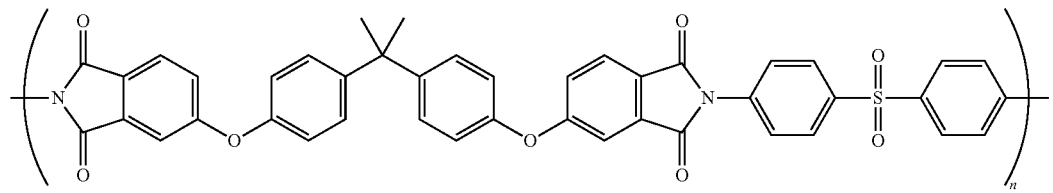

Comparative Example 1

Polymerization with No Catalyst

A 250 mL 3-necked round-bottomed flask equipped with a mechanical stirrer, a nitrogen inlet and a Dean-Stark trap was charged at room temperature with 4,4'-diaminodiphenylsulfone (DDS, 10.8 gr, 43.49 mmol), BPADA (22.512 g, 43.25 mmol) phthalic anhydride (PA, 250 mg, 1.69 mmol) and 100 mL of o-DCB. While stirring and keeping a positive nitrogen flow, the flask was then immersed in an oil bath and gradually heated to 190° C. and then to 210° C. during which 42 mL of o-DCB were distilled off within 3 hrs. Heating was continued at reflux for 50 hrs after which GPC measurement indicated a Mw of 39.7 KD based on PS standards calibration.

Example 2

Polymerization with HEGCl as Catalyst

Following a similar procedure described in comparative example 1, the reaction flask was charged at room temperature with the same amounts of 4,4'-diaminodiphenylsulfone (DDS, 10.8 gr, 43.49 mmol), BPADA (22.512 g, 43.25 mmol) phthalic anhydride (PA, 250 mg, 1.69 mmol) and 100 mL of o-DCB. The flask was then immersed in an oil bath and gradually heated to 190° C. and then to 210° C. within 1.5 hrs during which 42 mL of o-DCB were distilled off and GPC indicated a Mw of 4.83 KD. HEGCl catalyst was added (about 58 mg as a 17% solution in o-DCB, 0.5 mol % based on DDS charge). Heating was continued at reflux for 10 hrs. GPC measurement of samples drawn at 7 and 10 hrs showed Mw of 43.83 and 43.89 KD respectively indicating that the reaction was complete in 7 hrs.

Example 3

Polymerization with HEGCl as Catalyst

Following a similar procedure as described in comparative example 1, the reaction flask was charged at room temperature with the same amounts of 4,4'-diaminodiphenylsulfone (DDS, 10.8 gr, 43.49 mmol), BPADA (22.512 g, 43.25 mmol) phthalic anhydride (PA, 250 mg, 1.69 mmol) and 100 mL of o-DCB. The flask was then immersed in an oil bath and gradually heated to 190° C. and then to 210° C. within 1.5 hrs during which 43 mL of o-DCB were distilled off. HEGCl catalyst was added (about 23 mg as a 17% solution in o-DCB, 0.2 mol % based on DDS charge). Heating was continued at reflux for 10 hrs. GPC measurement of samples drawn at 7, 8.5, and 10 hrs showed Mw of 39.19, 40.79, and 40.04 KD respectively indicating that the reaction was complete in 8.5 hrs.

Figure 9:
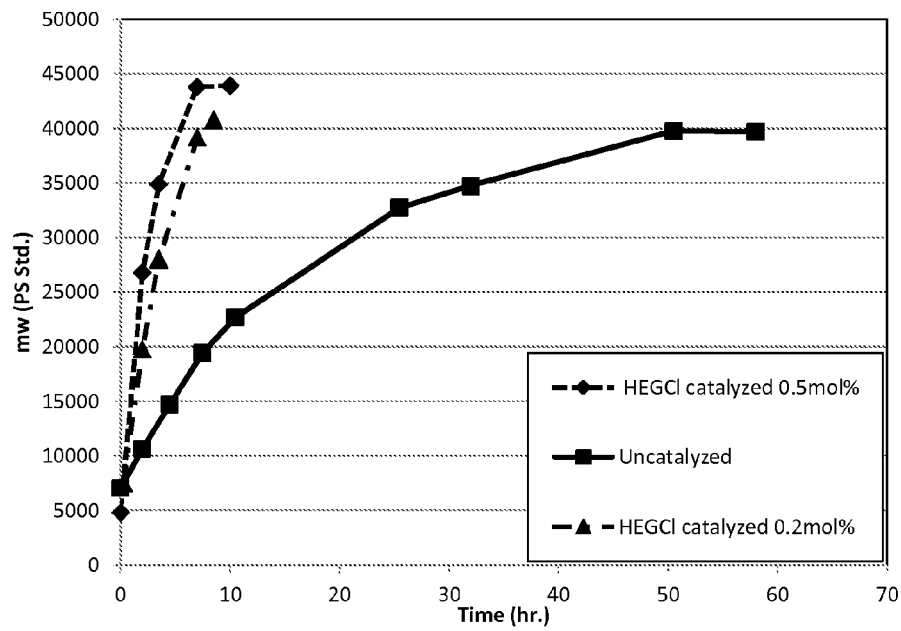
FIG. 9 is a graph showing Mw of polyetherimides as a function of times for uncatalyzed and HEGCl catalyzed polycondensation reactions between DDS and BPADA.

The Mw build over time for Comparative Example 1 and Examples 2 and 3 is shown numerically in Table A and graphically in FIG. 9.

TABLE A

Mw Build in the Polycondensation of BPADA with DDS.

| Comparative Example 1 Uncatalyzed | | Example 2 HEGCl at 0.5 mol % | | Example 3 HEGCl at 0.2 mol % | |
|---|---|---|---|---|---|
| Time (hr) | Mw | Time (hr) | Mw | Time (hr) | Mw |
| 0 | 7013 | 0 | 4827 | 0.25 | 7525 |
| 2 | 10652 | 2 | 26785 | 2 | 19807 |
| 4.5 | 14722 | 3.5 | 34882 | 3.5 | 28022 |
| 7.5 | 19455 | 7 | 43826 | 7 | 39190 |
| 10.5 | 22699 | 10 | 43896 | 8.5 | 40789 |
| 25.5 | 32737 | | | 10 | 40044 |
| 32 | 34742 | | | | |
| 50.5 | 39764 | | | | |
| 58 | 39691 | | | | |

Comparative Example 4 and Example 5

The following examples demonstrate that HEGCl is an effective catalyst for the polycondensation of Bisphenol A dianhydride (BPADA) and meta-phenylene diamine, as shown below.

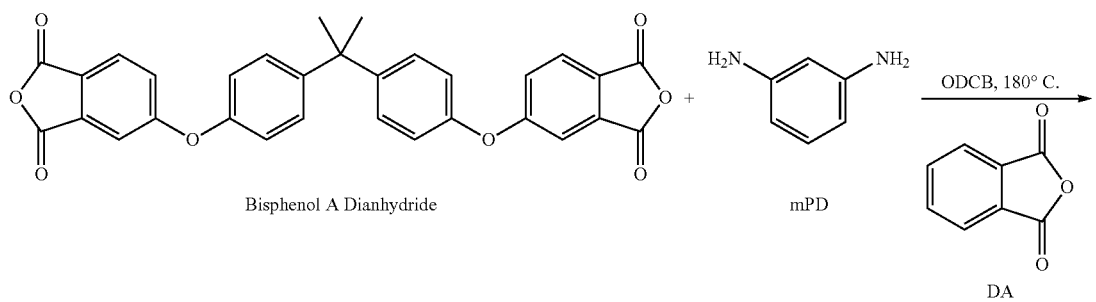

Bisphenol A Dianhydride     mPD

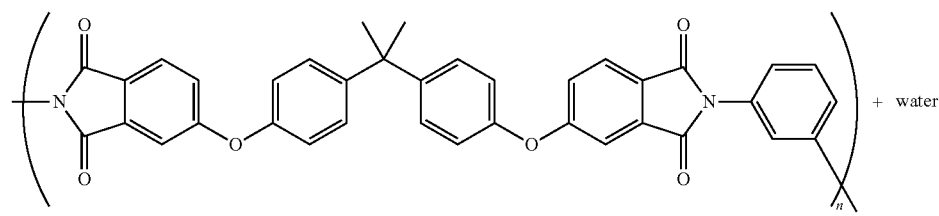

+ water

A 500-mL, 3-necked, round-bottomed flask, equipped with a mechanical stirrer, a Dean and Stark receiver, topped with a reflux condenser, and means to maintain an atmosphere of nitrogen was charged with 220 grams of ortho-dichlorobenzene, 80.00 grams of bisphenol A dianhydride (BPADA, 0.1537 moles), 17.197 grams of meta-phenylene diamine (mPD, 0.159 moles), and 1.283 grams of phthalic anhydride (PA, 0.011 moles). The number of moles of phthalic anhydride equaled 3.454 mole % of the total number of moles of anhydride moieties (two times the moles of bisphenol A dianhydride plus the moles of PA). This ratio of monomers and chain terminating agent will provide a polyetherimide with a Mw of ~45000 Daltons, with a polydispersity near 2.1, with 0.01 mole % excess anhydride end groups. Phthalic anhydride is the chain-terminating compound.

Figure 10:
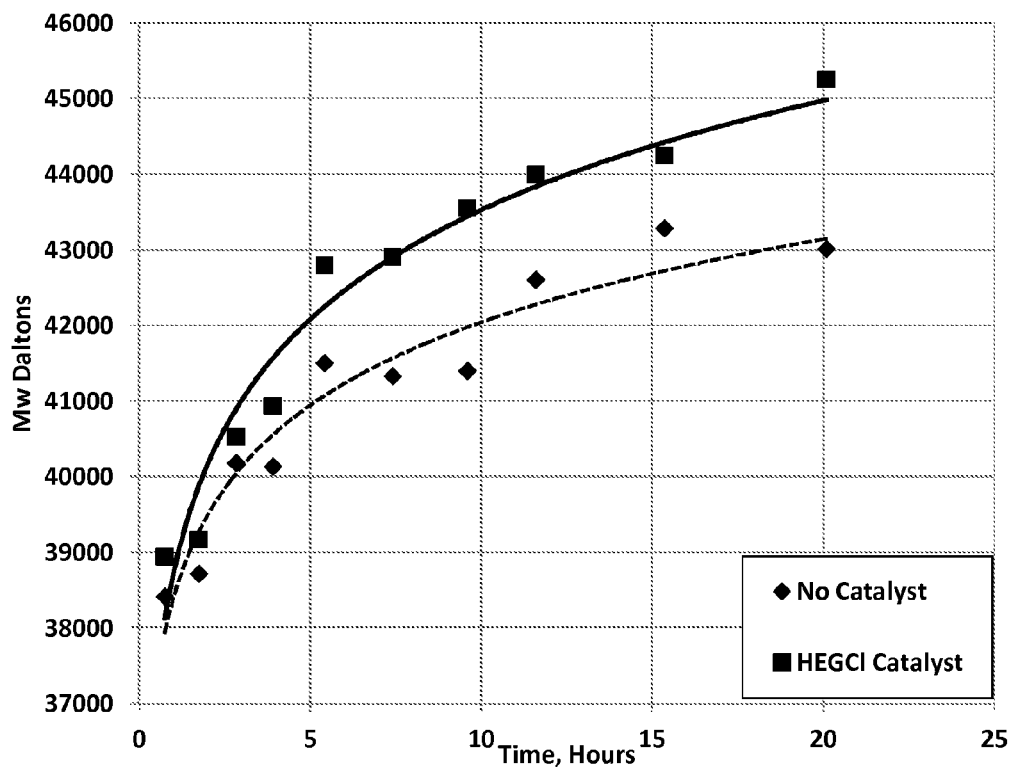
FIG. 10 is a graph showing Mw of polyetherimides as a function of times for uncatalyzed and HEGCl catalyzed polycondensation reactions between BPADA and mPD.

The reaction mixture was mechanically stirred under an atmosphere of nitrogen and the flask is then heated with an external oil bath maintained at 150° C. The monomers dissolved and began to polymerize. Water of imidization evolves was collected in the Dean and Stark receiver. The oil bath was maintained at 150° C. for 15 minutes and was then heated to 190° C. (oil bath) for 3 hours. The temperature of the reaction mass was approximately 180° C. The reaction mixture was then equally divided into two 3-necked, 250-mL round-bottomed flasks, equipped with a mechanical stirrer, a Dean and Stark receiver, topped with a reflux condenser, and means to maintain an atmosphere of nitrogen. One of the flasks was charged with solid dry HEGCl (0.21 gr, 0.8 mmoles, and 0.5 mol % with respect to the moles of mPD employed) (Example 5). The other flask was not charged with HEGCl (Comparative Example 4). The reaction mixtures were heated with an oil bath set at 190° C. and stirred; the time when the reactions achieved 190° C. was set as time zero. Samples of each flask were analyzed by GPC to determine the molecular weight of resin over time. The results are shown in Table B and graphically in FIG. 10. It can be seen that the material with HEGCl achieved the desired Mw within 20 hours of heating, while the reaction without HEGCl did not achieve the desired Mw.

TABLE B

Mw Build in the Polycondensation of BPADA with mPD

| Time at 180° C. (hr) | Comparative Ex. 4 Without HEGCl Mw | Ex. 5 With HEGCl Mw |
| --- | --- | --- |
| 0.75 | 38409 | 38942 |
| 1.75 | 38719 | 39164 |
| 2.83 | 40182 | 40521 |
| 3.92 | 40128 | 40934 |
| 5.42 | 41499 | 42795 |
| 7.42 | 41330 | 42906 |
| 9.59 | 41397 | 43548 |
| 11.6 | 42606 | 44000 |
| 15.35 | 43288 | 44243 |
| 20.1 | 43008 | 45251 |

Comparative Examples 6-91

The purpose of the following comparative examples was to observe whether catalysts used in our invention could also be used in a process for making polyimide monomers, useful in chloro displacement processes (instead of polycondensation processes) for making polyetherimides.

Comparative Examples 6-17

Quaternary phase transfer catalysts were screened to determine their efficacy as imidization catalysts. The specific catalysts screened were hexaethylguanidinium chloride (HEGCl), sodium phenylphosphinate (SPP), tetraphenylphosphonium bromide (TPPBr). 1,6-bis(tributylammonium)-hexane dibromide (C6B), 4-(N,N-dimethyl)-2-ethylhexylpyridinium chloride (PyrEHCl), tetrabutylammonium bromide (TBAB), 1,4,7,10,13,16-hexaoxacyclooctadecane (18-C-6), trihexyltetradecylphosphonium chloride (TTPCl), and 1-butyl-2,3-dimethylimidazolium chloride (BDMICl). To this end, 4-ClPA was reacted with mPD in the presence of phthalic anhydride in refluxing ortho-dichlorobenzene, to afford ClPAMI, a monomer used in the production of polyetherimides. The synthesis of ClPAMI can use various ratios of 3- and 4-ClPA, with 1 to 3 mol % phthalic anhydride (with respect to the total moles of substituted phthalic anhydride and phthalic anhydride employed). The phthalic anhydride becomes the eventual chain terminator in the polyetherimide resulting from the reaction of ClPAMI with disodium salt of bisphenol in o-DCB in the presence of an imidization catalyst.

Comparative Examples for Displacement Process

General Procedure to Evaluate Screen Catalyst Effectiveness as an Imidization Catalyst The procedure to screen the catalysts used standard laboratory glassware. A 3-necked, 1-liter, round-bottomed flask with 24/40 joints, was fitted with a center mounted mechanical stirrer with a Teflon paddle stir blade (the bottom of the stir blade was 1 cm from the bottom of the reaction vessel, a Dean and Stark Receiver placed in one of the side necks topped with a reflux condenser, and a solid addition funnel (LabGlass catalog #LG-8281t-104) topped with a nitrogen inlet. The outlet of the condenser was plumbed to a bubbler filled with a small amount of silicone oil. The inlet nitrogen supply was equipped with a flow meter that read 0.0 to 5.0 standard cubic feet per hour (scfh). The flask was charged with 69.30 grams (379.6 mmol) of 4-chlorophthalic anhydride (4-ClPA) containing 4 wt % of 3-chlorophthalic anhydride (3-ClPA) and 434 grams of reagent grade ortho-dichlorobenzene. The mixture was heated with an external oil bath under a nitrogen blanket with mechanical stirring (150 rpm) to afford a clear solution. The oil temperature was set at 175° C. The oil level in the oil bath was placed at the same level as the material inside the flask. The solid addition funnel was charged with 20.60 grams (190.5 mmol) of DuPont solid flake metaphenylene diamine (mPD) under nitrogen, with a nitrogen flow rate of 1 standard cubic foot per hour. The mPD was added to the o-DCB/ClPA solution over a 45-minute period. Generally, about 5 mL of o-DCB and about 5 mL of water collected in the arm of the receiver over the course of the mPD addition, and was discarded. The product (ClPAMI) precipitated from the solution as the reaction progressed, to afford a thick yellow slurry. During the reaction, the stirring rate was gradually increased to 350 rpm as the reaction mixture thickened. The stirring rate was periodically adjusted to minimize splattering of the material on the upper climbs of the vessel. The solid addition funnel was heated with a heat gun to melt any residual mPD left in the funnel and was then rinsed with 20 grams of hot reagent grade o-DCB to complete the transfer of mPD to the vessel. The addition funnel was removed from the flask and the nitrogen supply was adapted in its place.

The oil temperature was then increased to 185° C. and the nitrogen flow rate was increased to 1.5 scfh. o-DCB was allowed to distill from the vessel and was collected in the arm of the receiver. About 47 grams of o-DCB was allowed to distill from the vessel. The condensed o-DCB was removed from the arm of the receiver and not allowed to return to the vessel. Once 47 grams of o-DCB had been collected, the vessel was placed under a blanket of nitrogen rather than a sweep of nitrogen (i.e., the nitrogen was adjusted to a minimum flow).

Phthalic anhydride (0.566 gr, 3.82 mmol) in 3 mL of o-DCB was added to the flask 1.25 hours after the end of the mPD addition to the flask (2 hours total reaction time). The nitrogen flow was increased to 1.5 scfh with an oil temperature of 185° C. Once 3 mL of o-DCB had been collected in the arm of the receiver, the nitrogen flow was then decreased to maintain a nitrogen blanket on the vessel. At this point, the amount of o-DCB in the vessel was about 407 grams and the weight of the ClPAMI product present was about 83.3 grams (17.0% solids). The reaction was heated with 185° C. oil for one hour (3 hours of total reaction time), and then a sample of the reaction was taken and analyzed for residual 4-ClPA and the residual chloromonoamine (structure 20a) by HPLC (high pressure liquid chromatography. An imidization catalyst (1 mole %, with respect to the amount of mPD employed in the reaction) was added to the vessel just after the reaction mixture was sampled (i.e., after 3 hours of reaction time). In the instance of HEGCL, the catalyst was delivered as a dry solution of HEGCl dissolved in dry o-DCB at 17 to 20 wt % solids. The moisture of the solution was generally 10 ppm water. The reaction mixture was then heated for 1 hour with 185° C. oil, and a sample of the reaction was taken (after 4 hours of reaction time) and analyzed for residual ClPA and the residual chloromonoamine (structure 20a) by HPLC (high pressure liquid chromatography). The reaction was continued and the reaction mixture was then sampled for ClPAMI, residual ClPA and 4-chloromonoimide over the desired amount of time. The results are shown in Tables 2 and 3. The overall stoichiometry of each ClPAMI reaction as a function of time is shown in Table 4.

TABLE 2

Amount of Residual ClPA (4-ClPA plus 3-ClPA) in ClPAMI (mol % based on total monomer content) for Screened Catalysts as a Function of Time.

| Time* | C. Ex. 6 No catalyst | C. Ex. 7 1 mol % HEGCl | C. Ex. 8 0.2 mol % HEGCl | C. Ex. 9 0.25 mol % SPP | C. Ex. 10 1 mol % TPPBr | C. Ex. 11 1 mol % C6B | C. Ex. 12 1 mol % PyrEHCl | C. Ex. 13 1 mol % TBAB | C. Ex. 14 0.2 mol % PyrEHCl | C. Ex. 15 1 mol % 18-C-6 | C. Ex. 16 1 mol % TTPCl | C. Ex. 17 1 mol % BDMICl |
|---|---|---|---|---|---|---|---|---|---|---|---|---|
| 0 | NM | NM | NM | NM | NM | NM | NM | NM | NM | NM | NM | NM |
| 1 | NM | NM | NM | NM | NM | NM | NM | NM | NM | NM | NM | NM |
| 2 | NM | NM | NM | NM | NM | NM | NM | NM | NM | NM | NM | NM |
| 3 | 1.52 | ** | ** | ** | ** | ** | ** | ** | ** | ** | ** | ** |
|   |   | 1.5 | NM | NM | 1.45 | 1.55 | 1.83 | 1.79 | 1.58 | 1.62 | 1.83 | 1.94 |
| 4 | 1.13 | 0.13 | 1.75 | 1.85 | 0.49 | 0.28 | 0.21 | 0.46 | 0.59 | 1.34 | 0.98 | 0.61 |
| 5 | 0.88 | 0.07 | 0.53 | 0.84 | 0.31 | 0.19 | 0.12 | 0.33 | 0.35 | 1.17 | 0.56 | 0.44 |
| 6 | 0.82 | <=.07 | 0.31 | 0.55 | 0.22 | NM | 0.09 | 0.26 | 0.19 | 1.03 | 0.46 | 0.40 |
| 7 | 0.77 | <=.07 | 0.2 | 0.38 | NM | NM | NM | NM | NM | 0.93 | NM | NM |

*Time given is the time the substituted phthalic anhydride and the diamine have reacted. For example, if the imidization catalyst is added when the substituted phthalic anhydride and the diamine initially react, the time is 0. If the imidization catalyst is added three hours after the substituted phthalic anhydride and the diamine have reacted, the time is 3 hours.
** Indicates time when the catalyst is added after the substituted phthalic anhydride and the diamine have reacted.
NM—not measured.

TABLE 3

Amount of Residual chloromonoamine (4-chloromonoamine plus 3-chloromonoamine) (20a) in ClPAMI (mol % based on total monomer content) for Screened Catalysts as a Function of Time.

| Time* | C. Ex. 6 No catalyst | C. Ex. 7 1 mol % HEGCl | C. Ex. 8 0.2 mol % HEGCl | C. Ex. 9 0.25 mol % SPP | C. Ex. 10 1 mol % TPPBr | C. Ex. 11 1 mol % C6B | C. Ex. 12 1 mol % PyrEHCl | C. Ex. 13 1 mol % TBAB | C. Ex. 14 0.2 mol % PyrEHCl | C. Ex. 15 1 mol % 18-C-6 | C. Ex. 16 1 mol % TTPCl | C. Ex. 17 1 mol % BDMICl |
|---|---|---|---|---|---|---|---|---|---|---|---|---|
| 0 | NM | NM | NM | NM | NM | NM | NM | NM | NM | NM | NM | NM |
| 1 | NM | NM | NM | NM | NM | NM | NM | NM | NM | NM | NM | NM |
| 2 | NM | NM | NM | NM | NM | NM | NM | NM | NM | NM | NM | NM |
| 3 | ** | ** | ** | ** | ** | ** | ** | ** | ** | ** | ** | ** |
|   | 1.605 | 1.643 | NM | NM | 1.602 | 1.661 | 1.857 | 1.835 | 1.725 | 1.782 | 1.28% | 1.53% |
| 4 | 1.32 | 0.25 | 1.675 | 1.837 | 0.697 | 0.447 | 0.278 | 0.572 | 0.763 | 1.644 | 0.46% | 0.36% |
| 5 | 1.103 | 0.131 | 0.59 | 0.943 | 0.478 | 0.253 | 0.145 | 0.326 | 0.494 | 1.361 | 0.16% | 0.18% |
| 6 | 0.98 | NM | 0.339 | 0.581 | 0.369 | NM | 0.08 | 0.334 | 0.271 | 1.271 | 0.08% | 0.12% |
| 7 | 0.908 | NM | 0.195 | 0.382 | NM | NM | NM | NM | NM | 1.285 | NM | NM |

*Time given is the time the substituted phthalic anhydride and the diamine have reacted. For example, if the imidization catalyst is added when the substituted phthalic anhydride and the diamine initially react, the time is 0. If the imidization catalyst is added three hours after the substituted phthalic anhydride and the diamine have reacted, the time is 3 hours.
** Indicates time when the catalyst is added after the substituted phthalic anhydride and the diamine have reacted.
NM—not measured.

TABLE 4

Stoichiometry of ClPAMI (mol %) for Screened Catalysts as a Function of Time.

| Time* | C. Ex. 6 No catalyst | C. Ex. 7 1 mol % HEGCl | C. Ex. 8 0.2 mol % HEGCl | C. Ex. 9 0.25 mol % SPP | C. Ex. 10 1 mol % TPPBr | C. Ex. 11 1 mol % C6B | C. Ex. 12 1 mol % PyrEHCl | C. Ex. 13 1 mol % TBAB | C. Ex. 14 0.2 mol % PyrEHCl | C. Ex. 15 1 mol % 18-C-6 | C. Ex. 16 1 mol % TTPCl | C. Ex. 17 1 mol % BDMICl |
|---|---|---|---|---|---|---|---|---|---|---|---|---|
| 0 | NM | NM | NM | NM | NM | NM | NM | NM | NM | NM | NM | NM |
| 1 | NM | NM | NM | NM | NM | NM | NM | NM | NM | NM | NM | NM |
| 2 | NM | NM | NM | NM | NM | NM | NM | NM | NM | NM | NM | NM |
| 3 | ** | ** | ** | ** | ** | ** | ** | ** | ** | ** | ** | ** |
|   | −0.09 | −0.14 | NM | NM | −0.15 | −0.11 | −0.03 | −0.04 | −0.15 | −0.16 | 0.56 | 0.41 |
| 4 | −0.19 | −0.12 | 0.08 | 0.01 | −0.21 | −0.17 | −0.07 | −0.11 | −0.17 | −0.30 | 0.53 | 0.25 |
| 5 | −0.22 | −0.06 | −0.06 | −0.10 | −0.17 | −0.06 | −0.03 | 0.00 | −0.14 | −0.19 | 0.39 | 0.26 |
| 6 | −0.16 | NM | NM | −0.03 | −0.15 | NM | 0.01 | −0.07 | −0.08 | −0.24 | 0.38 | 0.28 |
| 7 | −0.14 | NM | NM | 0.00 | NM | NM | NM | NM | NM | −0.36 | NM | NM |

*Time given is the time the substituted phthalic anhydride and the diamine have reacted. For example, if the imidization catalyst is added when the substituted phthalic anhydride and the diamine initially react, the time is 0. If the imidization catalyst is added three hours after the substituted phthalic anhydride and the diamine have reacted, the time is 3 hours.
** Indicates time when the catalyst is added after the substituted phthalic anhydride and the diamine have reacted.
NM—not measured.

As shown in the Tables 2-4, only 18-C-6 was ineffective as an imidization catalyst. Other than SPP and 18-C-6, the catalysts screened are capable of facilitating the reaction of ClPA with mPD to produce ClPAMI. Our results, as evidenced by Table 2, also show if the imidization catalyst reacts in the presence of the solvent at about 5 hours after the substituted phthalic anhydride and the diamine have reacted, the use of imidization catalyst selected from quaternary ammonium salts, quaternary phosphonium salts, guanadinium salts, pyridinium salts, imidazolium salts results in a reaction mixture having significantly lower substituted phthalic anhydride residuals as compared to situations where other catalysts (or no catalysts) are used.

The normal amount of SPP catalyst used to prepare ClPAMI is 0.25 mol %, when added with the monomers (ClPA, PA and mPD) at the beginning of the reaction. It was observed in a separate instance that when SPP was added at the beginning of the reaction between the dianhydride and the diamine (time=0), the amount of ClPA residuals at 3,4,5,6, and 7 hours after the dianhydride and the diamine reaction were 0.42, 0.34, 0.33. 0.8, 0.08, respectively. It can be seen from the 5-hour data that every catalyst evaluated was better or nearly as good as 0.25 mol % SPP added with the monomers (including PA) at the beginning of the reaction.

Comparative Examples 19 and 20

Another set of potential catalysts for imidization was evaluated. In this study, the molar ratio of amine groups to anhydride groups was 1 mol % excess amine. It is known that the rate of ClPAMI formation is accelerated when excess amine groups are present. (The opposite is also true, the rate of ClPAMI formation is accelerated when excess anhydride groups are present.) Running the screening study with 1 mol % excess amine groups was done to facilitate the speed of the study. For comparative purposes, the imidization reaction was run at 1 mol % excess amine groups compared to anhydride groups, in the presence and absence of sodium phenyl phosphinate (0.29 mol % with respect to the moles of mPD used), as described below, in comparative examples 19 and 20.

Comparative Example 19

Synthesis of ClPAMI in the presence of SPP was carried out as follows. A 3-neck-round bottomed flask is charged with m-phenylene diamine (2.743 g, 25.365 mmol), 4-chlorophthalic anhydride (9.225 g, 50.531 mmol), sodium phenylphosphinate (SPP, 12 mg, 0.0731 mmol) and o-dichlorobenzene (65 g). The flask is assembled with a mechanical stirrer, a Dean-Stark trap and a nitrogen inlet then placed in pre-heated oil bath (170° C.). The mixture is stirred and the oil temperature is increased to 180° C. Nitrogen flow is gradually increased to allow a steady collection of water/o-DCB mixture in the Dean-Stark trap. Nitrogen flow is decreased when about 10 mL of o-DCB has been collected in the trap. The mixture is allowed to stir until no further change in residual 4-ClPA and 4-MA (final residual content: 0.8 to 1.0 mol % 4-MA and less than 0.05 mol % 4-ClPA with respect to m-PD charged). This experiment was repeated. Both reaction profiles are plotted in FIG. 1 as SPP Catalyzed.

Comparative Example 20

Synthesis of ClPAMI in the absence of SPP was carried out as follows. A 3-neck-round bottomed flask is charged with m-phenylene diamine (2.743 g, 25.365 mmol), 4-chlorophthalic anhydride (9.225 g, 50.531 mmol) and o-dichlorobenzene (65 g). The flask is assembled with a mechanical stirrer, a Dean-Stark trap and a nitrogen inlet then placed in pre-heated oil bath (170° C.). The mixture is stirred and the oil temperature is increased to 180° C. Nitrogen flow is gradually increased to allow a steady collection of water/o-DCB mixture in the Dean-Stark trap. Nitrogen flow is decreased when about 10 mL of o-DCB has been collected in the trap. The mixture is allowed to stir until no further change in residual 4-ClPA and 4-MA (final residual content: 0.8 to 1.0 mol % 4-MA and less than 0.05 mol % 4-ClPA with respect to m-PD charged). This experiment was repeated. Both reaction profiles are plotted in FIG. 1 as No Catalyst.

FIG. 1 shows the amount of residual ClPA in ClPAMI when made with 1 mol % excess amine groups, in the presence and absence of SPP imidization catalyst. FIG. 1 demonstrates rates acceptable with catalyzed polymerization. As can be seen the presence of SPP results in a ClPAMI product with less than 0.15 mol % residual ClPA in the product, the desired specification for ClPAMI produced under these conditions. For a catalyst to be useful in a manufacturing process that requires a certain production rate, the amount of residual ClPA in the ClPAMI should be less than 0.15 mol % within 6 hours, when the ClPAMI is made under the reaction conditions for comparative Example 15.

Comparative Examples 21-34

The compounds shown in Table 5 were evaluated for effectiveness as a catalyst for the imidization reaction and the polymerization reaction, and the results are shown in Table 5.

TABLE 5

| Ex. | Catalyst | Amount (mol %)[a] | Time to Completion (hour) | Catalyst for Imidization? | Catalyst for Polymerization? |
|---|---|---|---|---|---|
| C. Ex. 21 | None | None | 13 | No | no |
| C. Ex. 22 | SPP | 0.12 | 5 | Yes | no |
| C. Ex. 23 | Zinc acetate | 0.12 | >6 | No | no |
| C. Ex. 24 | Aluminum acetylacetate | 0.12 | 6 | Yes | no |
| C. Ex. 25 | Sodium tetraphenylborate | 0.12 | 4 | Yes | no |
| C. Ex. 26 | Cloisite sodium clay | 5.0 wt %[b] | 5 | Yes | no |
| C. Ex. 27 | Sodium chloride | 0.12 | >6 | No | no |
| C. Ex. 28 | Tolyl phthalizinone | 0.12 | >6 | No | no |
| CEx. 29 | Molecular sieves (14 angstroms) | 5.0 wt %[b] | 4 | Yes | no |
| C. Ex. 30 | Caffeine | 0.12 | >6 | No | no |
| C. Ex. 31 | HEGCl | 1.00 | 3 | Yes | yes |
| C. Ex. 32 | HEGCl | 0.20 | 4 | Yes | yes |
| C. Ex. 33 | HEGCl | 0.10 | 6 | Yes | yes |
| C. Ex. 34 | HEGCl | 0.05 | >6 | No | yes |

[a]Based on moles of mPD, except where indicated.
[b]Based on PEI polymer weight.

SPP, aluminum acetylacetate, sodium tetraphenylborate, the clay, molecular sieves, and HEGCl (0.1 to 1.0 mol %, or more, based on moles of mPD employed) were found to be useful imidization catalysts. Of the catalysts screened, only HEGCl could also be used as the catalyst to effect the polymerization of BPA disodium salt and ClPAMI to produce polyetherimide.

Comparative Examples 35 to 51

These examples demonstrate that the use of HEGCl as the imidization catalyst ultimately provides a polyetherimide with a lower yellowness index, lower R* and lower Mz/Mw than when SPP is used as the catalyst.

Comparative Examples 35 to 44 Imidization Process

Distilled o-DCB (19.74 parts) was charged to an appropriately sized oil-jacketed vessel, equipped with a mechanical stirrer, material addition lines and charge pot, an overhead vapor line with condenser, and means to maintain a nitrogen atmosphere. The quantity of o-DCB used in a particular reaction was based on the desired percentage solids (% solids) of the imidization reaction. The o-DCB was heated to 120° C. under nitrogen with stirring. Molten chlorophthalic anhydride (155.04 parts) was added to the vessel with stirring under nitrogen. Solid phthalic anhydride (0.0309 parts, 0.216 mole equivalents) was charged to the vessel through a charge pot, under nitrogen. Sodium phenylphosphinate (0.0038 parts, 0.024 mole equivalents) was then charged to the vessel through the charge pot. The pot was flushed with a small amount of distilled o-DCB. The temperature of the mixture was increased to about 160° C. over a period of 45 minutes by applying hot oil on the jacket of the vessel, with stirring, under nitrogen.

Molten meta-phenylene diamine (1 part, 9.58 mole equivalents), stored under nitrogen at 100° C., was then added to the vessel over a 90 minute period, with agitation, under nitrogen. After completion of the mPD addition, the temperature of the reactor was increased to 180° C. During this period mPD reacted with ClPA to afford a ClPAMI/o-DCB slurry containing intermediate products of the reaction and water as by-product. Water vapor leaving the reactor along with o-DCB were condensed and collected in a collection vessel. The reaction was allowed to heat for 1.5 to 2.0 hours with agitation under nitrogen to complete the reaction. A sample was taken from the vessel to measure the stoichiometry of the reaction by HPLC analysis. The desired stoichiometry specification of the product was −0.2 to 0.3 mole % of excess ClPA to monoamine (20a). If the reaction was not within specification, ClPA or mPD was added to the vessel at 180° C. (hereafter this procedure is referred as stoich correction) to achieve the desired product specification. After 1 hour from the completion of stoic correction a sample was drawn again for measuring the stoichiometry. The procedure of sampling, analysis, and stoich (stoichiometry) correction was continued until the desired stoichiometry was achieved. Once the product was within specification, o-DCB was distilled from the vessel until the moisture in the o-DCB condensate was less than 20 ppm water. Generally, the ClPAMI was present in the o-DCB at about 20 wt % solids by the time the reaction was judged to be dry. If the reaction was not dry, then dry distilled o-DCB was added to the vessel and removed by distillation until the reaction was judged dry. The dry ClPAMI/o-DCB on-stoichiometry slurry at 18 to 21 wt % solids was ready for polymerization. Generally at the completion of a batch of ClPAMI manufacture, the amount of residual monoamine (20a) was less than 0.2 mol %, and the amount of residual ClPA was less than 0.4 mol %, with respect to the total moles of amine groups charged to the reactor in the form of mPD.

Comparative Examples 45-51 Imidization Process

ClPAMI was also made with the use of HEGCl as the imidization catalyst instead of SPP. Distilled o-DCB (19.74 parts) was charged to an appropriately sized oil jacketed vessel, equipped with a mechanical stirrer, material addition lines and charge pot, an overhead vapor line with condenser, and means to maintain a nitrogen atmosphere. The quantity of o-DCB used in a particular reaction was based on the desired percentage solids of the imidization reaction. The o-DCB was heated to 120° C. under nitrogen with stirring. Molten chlorophthalic anhydride (155.04 parts) was added to the vessel with stirring under nitrogen. Solid phthalic anhydride (0.0309 parts, 0.216 mole equivalents) was charged to the vessel through a charge pot, under nitrogen. The pot was flushed with a small amount of distilled o-DCB. The temperature of the mixture was increased to about 160° C. over a period of 45 minutes by applying hot oil on the jacket of the vessel, with stirring under nitrogen.

Molten meta-phenylene diamine (1 part, 9.58 mole equivalents), stored under nitrogen at 100° C., was then added to the vessel over a 90 minute period, with agitation under nitrogen. After completion of the mPD addition, the temperature of the reactor was increased to 180° C. During this period mPD reacted with ClPA to afford a ClPAMI/o-DCB slurry containing intermediate products of this reaction and water as byproduct. Water vapors leaving the reactor along with o-DCB were condensed and collected in the collection vessel. The reaction was allowed to heat for 1.5 to 2.0 hours with agitation under nitrogen to complete the reaction. A sample was taken from the vessel to measure the stoichiometry of the reaction by HPLC analysis. The desired stoichiometry specification of the product was −0.2 to 0.3 mole % of excess ClPA compared to the moles of monoamine (20a). If the reaction was not within specification, ClPA or mPD was added to the vessel at 180° C. (hereafter this procedure is referred as stoichiometric correction) to achieve the desired product specification. After 1 hour from the completion of stoichiometric correction a sample was drawn again for measuring the stoichiometry. The procedure of sampling, analysis, and stoich correction was continued until the desired stoichiometry was achieved. Once the product was within specification, o-DCB was distilled from the vessel until the moisture in the o-DCB condensate was less than 100 ppm water. Generally at this point in the batch, the ClPAMI was present in the o-DCB at 18 to 20 wt % solids. HEGCl (0.022 parts, 0.085 mole equivalents) was then added to the vessel as a 20 wt % solution in dry o-DCB. The reaction mixture was heated for 60 to 90 minutes with agitation under nitrogen. o-DCB was distilled from the vessel until the moisture in the o-DCB condensate was less than 30 ppm water. Heating the reaction mixture in the presence of the HEGCl for 60 minutes resulted in the conversion of ClPA and monoamine (20a) to ClPAMI, and the conversion of amic-acids (see scheme 1) to ClPAMI. The amount of residual chloromonoamine (20a) was less than 0.1 mol %, and the amount of residual ClPA was less than 0.3 mol %, with respect to the total moles of amine groups charged to the reactor in the form of mPD. If the reaction was not dry, then dry distilled o-DCB was added to the vessel and removed by distillation until the reaction was judged dry. The dry ClPAMI/o-DCB on-stoichiometry slurry at 18 to 22 wt % solids was ready for polymerization.

Polymerization and Quenching (General Procedure)

BPANa$_2$ slurry in o-DCB containing potassium phosphate (2.474 parts of BPANa$_2$ dry weight, 0.055 parts of potassium phosphate (K$_3$PO$_4$) (dry weight, 9.414 mole equivalents of BPANa$_2$, and 0.268 mole equivalents of potassium phosphate, all at about 21.40 wt % in o-DCB) was charged to the vessel containing the previously prepared ClPAMI/o-DCB slurry over a 45 minute period at 180° C., with agitation, under nitrogen. The molecular weight target for the reaction was 45,000 Daltons. The exothermic reaction ensued upon addition of the BPANa2 salt to the ClPAMI mixture. o-DCB was stripped from the reactor until the polymer wt % solids in the reactor was about 30 wt % solids.

After 2 hours from the completion of BPANa$_2$ salt addition, an aliquot sample was drawn for measuring the molecular weight (Mw) of the polymer. Similarly samples from the reactor were drawn after every hour and the Mw of the polymer was determined. This activity was carried out until the Mw of the polymer had leveled off (plateaued). The criterion used to identify when the polymer Mw was not significantly increasing was that three successive samples had a standard deviation of less than 500 Daltons. If the desired Mw was not achieved within 3000 Daltons, then a calculated amount of the BPANa$_2$/K$_3$PO$_4$ o-DCB slurry was charged to the reactor. After 1 hour from the completion of the salt correction, samples were drawn again and analyzed for Mw until a plateau of Mw was observed. If the desired Mw had not been achieved, a subsequent addition of a calculated amount of BPANa$_2$/K$_3$PO$_4$ o-DCB slurry was charged to the reactor.

Once the desired Mw of the polymer was achieved, the polymer solution was cooled to about 165° C. At this stage dry o-DCB was added to dilute the polymer solution from about 30 wt % solids to about 20 wt % solids (actual % solids might vary from batch to batch). Phosphoric acid (85 wt % in water, 0.055 parts of H$_3$PO$_4$ dry weight, 0.58 mole equivalents) was then charged to the reactor to quench the reaction. The mixture was stirred for one hour at 150 to 165° C., under nitrogen. The mixture was then diluted with distilled dry o-DCB to provide a mixture that was about 10 wt % polymer containing sodium chloride and phosphates salts that had precipitated from the solution.

Filtration

The polymer reaction mixture described above was pumped through a 13 to 20 micron sintered metal stainless steel filter at 100 to 165° C. The salt cake on the filter was rinsed with a clean dry o-DCB to provide a filtrate that was 6 to 9 wt % polymer solution in o-DCB that contained less than 10 ppm by weight of sodium, and the combined amount of hexaethylguanidinium salt and pentaethylguanidine present was in less than 4000 ppm. The filtrate was collected in a tank and cooled to 90 to 110° C.

Polymer Purification

The o-DCB polymer solution was pumped to an appropriately sized tank and contacted with water in a continuous fashion, with mixing at 90 to 110° C., under pressure if necessary to prevent boiling of the two phase system. The pH of the water was controlled to 3 to 5 with the use of phosphoric acid. The volume ratio of polymer solution to water was 2 to 1. The time in the agitated vessel was 30 seconds to 15 minutes. The agitation speed was low enough such that the two phases did not emulsify, but the contact between the phases was adequate. The contents of the mixer were then conveyed to a liquid full decanter operated under pressure to prevent boiling of the liquids, where the polymer solution phase separated from aqueous phase. The aqueous phase contained extracted hexaethylguanidinium salt and pentaethylguanidine and dissolved o-DCB. The water phase was then conveyed to an activated carbon bed to remove the organic constituents before discharge to a wastewater treatment plant. The organic phase was conveyed to another mixer and contacted with pH 3 to 5 water in a volume ratio of 2 to 1 at 90 to 110° C. under pressure, to remove any hexaethylguanidinium salt and pentaethylguanidine that was not removed in the first extraction. The time in the agitated vessel was 30 seconds to 15 minutes. The agitation speed was such that the two phases did not emulsify. The contents of the mixer were then conveyed to a liquid full decanter, where the polymer solution phase separated from aqueous phase. The water phase was then conveyed to an activated carbon bed to remove the organic constituents before discharging to a wastewater treatment plant. The organic phase was collected in a vessel under nitrogen. The sum of hexaethylguanidinium salt and pentaethylguanidine in the final polymer solution was less than 200 ppm.

Polymer Isolation

The vessel that had collected the purified polymer solution was equipped with an agitator, an overheads line with condenser, a bottom nozzle and line connected to a pump. The pump was connected to a heat exchanger. The discharge of the heat exchanger was connected to the top of the vessel. The heat exchanger was heated with hot oil. The material in the vessel was circulated through the pump and heat exchanger and back into the vessel, to bring the material in the vessel to reflux (180 to 190° C.), under nitrogen and 0 to 1 psig (pounds per square inch gauge). o-DCB was removed overhead to provide a polymer solution that was 27 to 35 wt % solids in the vessel.

The 30 wt % concentrated polymer solution was conveyed in a continuous manner via a pump to a heat exchanger that heated the material to 280 to 290° C. and then to the feed throat of a twin screw counter current extruder; there was a back pressure control valve between the extruder and the heat exchanger to prevent boiling inside of the heat exchanger. The extruder was equipped with a feed zone electrically heated to 300° C. with an atmospheric vent, followed by a barrel zone heated to 350° C. This later zone was equipped with a vent operated at 80 mm pressure, followed by three vents operated at 30 mm pressure. Each vent was connected to a condenser to condense the o-DCB that was vaporized from feed zone and each of the barrel sections of the extruder. The condensed o-DCB was combined and collected in a vessel. The o-DCB was distilled before reuse. The extruder conveyed the molten polymer through a die head to produce strands of polymer, which were cooled in an external water bath and taken up in a chopper to produce polymer pellets. The pellets weighed between 5 and 50 mg. The pellets contained less than 500 ppm o-DCB. Mw, PDI, PDI*, Yellowness Index (YI) and R* were measured as described above. All samples were vacuum dried at 150° C. for at least 4 hours before measurement.

Table 6 shows the analysis of polyetherimide pellets made with the use of SPP as the imidization catalyst (at 0.0038 parts, 0.024 mole equivalents).

TABLE 6

Properties Resulting From the Use of SPP in Imidization

| C. Ex. No. | Imidization Catalyst | Mw | PDI | Mz/Mw | R* | YI[a] |
|---|---|---|---|---|---|---|
| 35 | SPP | 51329 | 2.72 | 1.65 | 3.05 | 148 |
| 36 | SPP | 51144 | 2.73 | 1.65 | 3.02 | 140 |
| 37 | SPP | 49122 | 2.76 | 1.72 | 3.68 | 183 |
| 38 | SPP | 47352 | 2.64 | 1.65 | 3.07 | 162 |
| 39 | SPP | 50411 | 2.70 | 1.66 | 3.45 | 135 |
| 40 | SPP | 48971 | 2.72 | 1.71 | 3.40 | 162 |
| 41 | SPP | 47410 | 2.69 | 1.67 | 2.91 | 131 |
| 42 | SPP | 45868 | 2.65 | 1.66 | 2.97 | 121 |
| 43 | SPP | 44697 | 2.63 | 1.65 | 2.89 | 121 |
| 44 | SPP | 57075 | 2.96 | 1.77 | 3.75 | 134 |

[a]Measured on 0.5 g of polyetherimide pellets dissolved in 10 mL of methylene chloride.

Table 7 shows the analysis of polyetherimide pellets made with the use of HEGCl as the imidization catalyst (0.022 parts, 0.085 mole equivalents).

TABLE 7

Properties Resulting From the Use of HEGCl in Imidization

| Comparative Example No. | Imidization Catalyst | Mw | PDI | Mz/Mw | R* | YI[a] |
|---|---|---|---|---|---|---|
| 45 | HEGCl | 46462 | 2.63 | 1.60 | 2.37 | 102 |
| 46 | HEGCl | 47543 | 2.66 | 1.61 | 2.37 | 104 |
| 47 | HEGCl | 46215 | 2.56 | 1.57 | 2.30 | 111 |
| 48 | HEGCl | 43417 | 2.54 | 1.57 | 2.25 | 110 |
| 49 | HEGCl | 43362 | 2.46 | 1.55 | 2.21 | 108 |
| 50 | HEGCl | 42347 | 2.50 | 1.57 | 2.35 | 102 |
| 51 | HEGCl | 45247 | 2.48 | 1.57 | 2.32 | 102 |

[a]Measured on 0.5 g of polyetherimide pellets dissolved in 10 mL of methylene chloride.

As can be seen from Tables 6 and 7, the PDI* (Mz/Mw), R*, and YI were higher on average when SPP was used as the imidization catalyst compared to when HEGCl was used as the imidization catalyst. The data presented in Tables 6 and 7 was collected from a production facility when each step of the process was working properly. Over a one month period of continuous production of polymer (at 2 batches of polymer per day), the average YI of the final polymer pellets was 130 when SPP was employed as the imidization catalyst. Over a 2 month period of continuous production of polymer (at 2 batches per day), the average YI of the final polymer pellets was 109 when HEGCl was employed as the imidization catalyst.

HEGCl is an effective imidization catalyst when employed at 0.2 to 1.0 mol % (with respect to the moles of mPD used) at the start of an imidization reaction, or when added to the ClPAMI just after it is brought on stoichiometry. Either mode of addition results in a ClPAMI with low residual ClPA and low residual chloromonoamine (20a). Moreover, minimization of the time that HEGCl is heated with ClPAMI at 180° C. results in a lower color polymer.

A higher PDI* (Mz/Mw) or a higher R* indicates a polymer that is more branched. A branched polymer behaves rheologically different than a less branched or unbranched polymer when molded. These differences can negatively affect molding cycle times. Branched polymers can become non-processable if they were to branch slightly more. For example, when a branched polymer is molded at a slightly higher than normal temperature, then more branching of the polymer can occur during molding, resulting in a cross-liked part with decreased tensile strength and impact resistance.

The Mw of the polymer in the feed to the extruder is typically less than the Mw of the extruded material. The molecular weight build across the extruder is problematic in that the desired Mw of polymer is not always obtained, nor is predictable. It has been found that the Mw build across the extruder is less when HEGCl is used as the imidization catalyst added at the end of the ClPAMI reaction (1 mol %, with respect to the number of moles of mPD employed), as compared to when SPP is used as the imidization catalyst (0.25 mol % with respect to the number of moles of mPD employed). For example, polymer made on an industrial scale using SPP as the imidization catalyst, as described for comparative examples 35-44, gave an average of a Mw increase of 8195 Dalton (with a standard deviation of 2762 Daltons) upon extrusion. Polymer made on an industrial scale using HEGCl as the imidization catalyst, as described for comparative examples 45-51, gave an average of a Mw increase of 2784 Dalton (with a standard deviation of 1218 Daltons) upon extrusion. Thus the use of HEGCl as the imidization catalyst affords polyetherimide polymer with a more predictable Mw, which eliminates the need to manage polyetherimide polymer produced with variable Mw.

Comparative Examples 52-63

Polyetherimide pellets made using either SPP or HEGCl as the imidization catalyst using the procedures of comparative examples 35-44 and comparative examples 46-51, were aged at 134° C. in the presence of water vapor in an autoclave over 6 days. Samples of the polymer were removed from the autoclave on day 2, 4, and 6. The samples were analyzed by GPC to determine the Mw of the polymer. The Mw decrease after 4 days was compared to the initial Mw, and the percent Mw retention was calculated.

The results are shown in Table 8.

TABLE 8

Hydro-Stability Data of Polyetherimides

| Example | Synthetic Route to PEI[a] | Mw (Time 0) | MW (Day 2) | Mw (Day 4) | Mw (Day 6) | Mw Retention (after 4 days) |
|---|---|---|---|---|---|---|
| C. Ex. 52 | Dianhydride and Diamine | 44858 | 51538 | 43285 | 43215 | 96% |
| C. Ex. 53 | Dianhydride and Diamine | 43852 | 44123 | 42396 | 41831 | 97% |
| C. Ex. 54 | Dianhydride and Diamine | 52649 | 26350 | 49641 | 48253 | 94% |
| C. Ex. 55 | Dianhydride and Diamine | 44063 | 43310 | 41941 | 40861 | 95% |
| C. Ex. 56 | ClPAMI/SPP and BPANa2 | 47254 | 41400 | 38235 | 36355 | 81% |
| C. Ex. 57 | ClPAMI/SPP and BPANa2 | 47136 | 44907 | 41880 | 40224 | 89% |
| C. Ex. 58 | ClPAMI/HEGCl and BPANa$_2$ | 41969 | 22357 | 38908 | 38382 | 93% |
| C. Ex. 59 | ClPAMI/HEGCl and BPANa$_2$ | 41732 | 39621 | 38528 | 37425 | 92% |
| C. Ex. 60 | ClPAMI/HEGCl and BPANa$_2$ | 41282 | 40467 | 39841 | 38438 | 97% |
| C. Ex. 61 | ClPAMI/HEGCl and BPANa$_2$ | 42741 | 40749 | 39350 | 38429 | 92% |
| C. Ex. 62 | ClPAMI/HEGCl and BPANa$_2$ | 43797 | 22405 | 39631 | 39414 | 90% |
| C. Ex. 63 | ClPAMI/HEGCl and BPANa$_2$ | 43757 | 42070 | 39773 | 38886 | 91% |

[a]Dianhydride and diamine = PEI formed by polycondensation of BPA dianhydride with meta-phenyldiamine (commercial process).
ClPAMI/SPP and BPANa$_2$ = PEI made from ClPAMI (SPP as the imidization catalyst) and bisphenol A disodium salt.
ClPAMI/HEGCl and BPANa$_2$ = PEI made from ClPAMI (HEGCl as the imidization catalyst) and bisphenol A disodium salt.

It was found that polymer made from using HEGCl as the imidization catalyst (Comparative Examples 58-63) aged better than polymer made from using SPP (Comparative Examples 56 and 57) as the imidization catalyst under the autoclave conditions. A commercial polyetherimide made from bisphenol A dianhydride and meta-phenylene diamine by the polycondensation method aged better than either of the polymers made from BPANa$_2$ and ClPAMI (Comparative Examples 52-55).

Comparative Example 64-70

The following examples demonstrate the use of HEGCl as an effective catalyst for the imidization between 3-chlorophthalic anhydride and diaminodiphenyl sulfone to produce DDS-ClPAMI in accordance with Equation 1. U.S. Pat. No. 7,981,996 describes DDS-ClPAMI in detail.

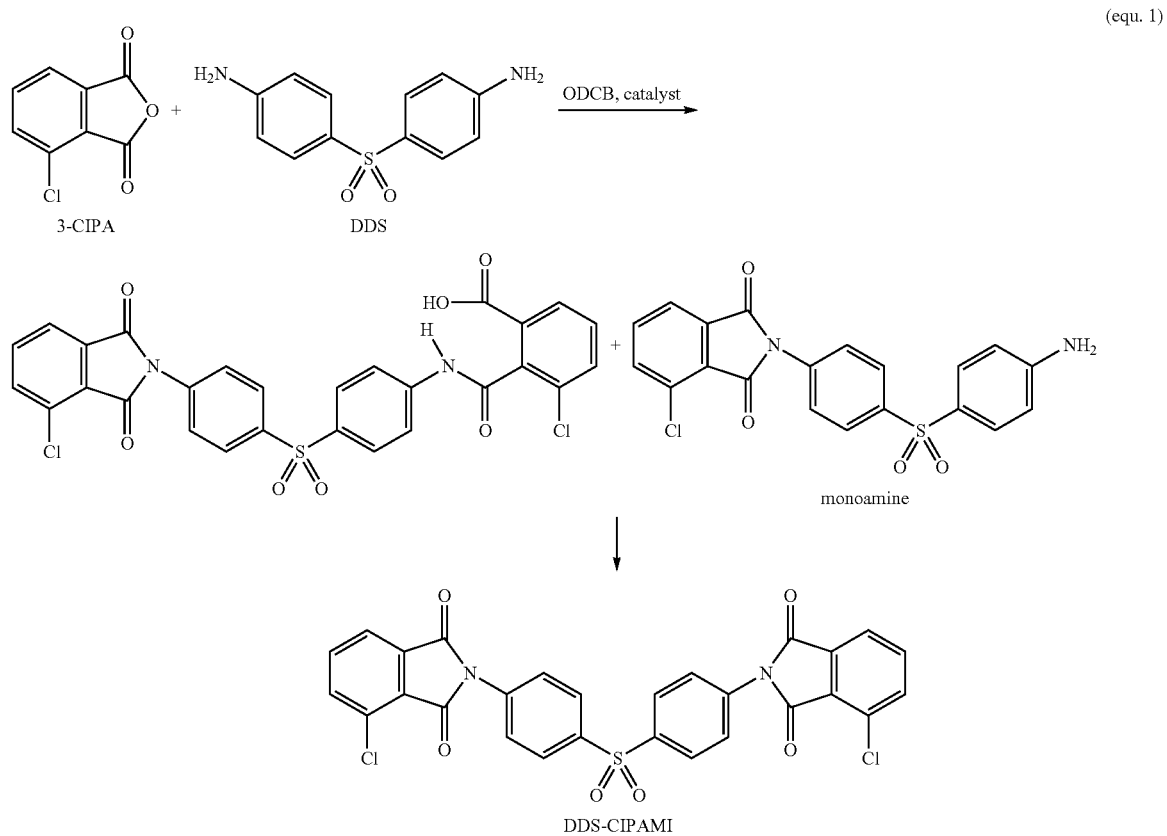

(equ. 1)

Comparative Example 64

The following procedure is for the reaction of 3-ClPA with 4,4'-DDS with the use of SPP as the imidization catalyst. A 250 mL, 3-necked round-bottomed flask equipped with a mechanical stirrer, a nitrogen inlet and a Dean-Stark trap was charged with 4,4'-diaminodiphenylsulfone (DDS) (6.4 gr, 25.775 mmol), 3-chlorophthalic anhydride (3-ClPA) or a mixture of 3-ClPA with up to 5% of 4-ClPA (9.411 gr, 51.551 mmol), sodium phenylphosphinate (SPP), (21.1 mg, 0.128 mmol, 0.5 mol % relative to DDS) and 100 mL of o-DCB. The flask was immersed in an oil bath and heated to reflux with azeotropic removal of water. After 40 mL of o-DCB was distilled the reaction solution remained as a clear solution and after a while the mixture turned into thick white slurry. The reaction was allowed to proceed to a point where the intermediate monoamine-imide (MA, equation, monoamine) was at a relatively low level that it could be completely quantified by the HPLC method to give a correct bisimide analysis. A 3-ClPA or DDS correction was made to place the stoichiometry at 0.25-0.3 mol % excess ClPA based on ClPA charge. Internal reflux was maintained without additional removal of o-DCB until the reaction reached a specified residual monoamine level. As a representative example, the residual 3-ClPA and monoamine were 1.26 and 0.84 mol % respectively after 24 hours at reflux subsequent to final stoichiometry correction.

Comparative Examples 65-70

The following general procedure describes the use of HEGCl as an imidization catalyst to produce DDS-ClPAMI from 3-ClPA and DDS. As described above, 4,4'-DDS, 3-ClPA (or 3- and 4-ClPA mixture), 1 mol % of HEGCl (54.8 mg as a 17 wt % solution of HEGCl in dry o-DCB), and the solvent were charged to the flask and heated to reflux. Approximately 40 mL of o-DCB was distilled from the flask to afford a clear solution. The reaction was kept at reflux for 1.5 hours. A sample was withdrawn for HPLC analysis and the appropriate correction was made (DDS or ClPA add) to place the stoichiometry at 0.25 to 0.3 mol % excess ClPA. The reaction mixture was allowed to proceed with internal reflux until the residual ClPA and monoamine (MA) levels were met (7-9 hours) (Comparative Example 65).

In Comparative Example 66, 0.2 moles (with respect to DDS) was added with the monomers, and the reaction was allowed to proceed as described above.

In Comparative Example 67, 0.2 moles of HEGCl (with respect to DDS) was added after the reaction mixture began to reflux.

In Comparative Example 68, 0.2 moles of HEGCl was added with the monomers, the reaction was brought to reflux, the stoichiometry adjusted, and then an additional 0.6 moles of HEGCl was added to the reaction and the mixture was refluxed for 12 hours to provide a DDS-ClPAMI with low residual amounts of 3-ClPA (0.15 mol %), and the monoamine (0.02 mol %, equation 1).

Comparative Example 69 was run as described for Comparative Example 68, except that the reaction was run on a larger scale (42 grams of DDS) at higher wt % solids (18.5).

In Comparative Example 70, a 250 mL 3-necked round bottomed flask equipped with a mechanical stirrer, a Dean-Stark trap and a pressure equalizing addition funnel was charged under nitrogen with 4,4'-DDS (8.4 gr., 33.83 mmol) and o-DCB (85 mL). The flask and its contents were heated in an oil bath at 160° C. at which temperature DDS was completely soluble. Molten 3-ClPA (12.352 gr., 67.66 mmol) was charged dropwise from the addition funnel during 15 minutes. All through the 3-ClPA addition, all contents in the flask remained in solution. The addition funnel was rinsed with 2 mL of o-DCB and the whole reaction mixture was heated to distill 19 mL of o-DCB leaving a reaction mixture at 18% solids. Another 19 mL of solvent were distilled off in 30 minutes and a solid product started to precipitate after an additional 60 minutes at reflux. At that point, HEGCl (18 mg. as 17% solution in o-DCB) was added and the reaction was heated for an hour accompanied by distillation of 8 mL of solvent leaving a reaction mixture at 20% solids. HPLC analysis revealed the need for a 3-ClPA correction, which was made, and an additional amount of HEGCl catalyst was added (54 mg as 17% o-DCB solution). The reaction was placed under internal reflux for 4 hours to complete the imidization, and HPLC analysis revealed 0.06 and 0.073 mol % residual 3-ClPA and monoamine (MA) respectively.

Reaction conditions and residual ClPA and MA amounts for Comparative Example 64-70 are summarized in Table 9.

TABLE 9

Use of SPP and HEGCl as Imidization Catalyst for DDS and 3-ClPA

| C. Ex. | DDS (g) | Cat. | Mole % Cat./ Addition Mode | Reaction Time** (hour) | (hour) after Cat Addn (time dose is in reaction) | % Solids | Residual ClPA (mol %) | Residual MA (mol %)*** | Comment |
|---|---|---|---|---|---|---|---|---|---|
| 64* | 6.4 | SPP | 0.5/ upfront | 24 | 24 | 16.5 | 1.26 | 0.84 | Monomers charged cold (room temperature). |
| 65* | 6.4 | HEGCl | 1.0/ upfront | 4 | 4 | 18.5 | 0.41 | 0.17 | Monomers charged cold (room temperature) with catalyst. |
| 66* | 6.4 | HEGCl | 0.2/ upfront | 18 | 18 | 16.5 | 0.24 | 0.03 | Monomers charged cold (room temperature) with catalyst. |
| 67* | 6.4 | HEGCl | 0.2/at 180° C. | 7 | 5.5 | 16.5 | 0.26 | 0.078 | Monomers charged cold (room temperature), but catalyst charged hot. |

TABLE 9-continued

Use of SPP and HEGCl as Imidization Catalyst for DDS and 3-ClPA

| C. Ex. | DDS (g) | Cat. | Mole % Cat./ Addition Mode | Reaction Time** (hour) | (hour) after Cat Addn (time dose is in reaction) | % Solids | Residual ClPA (mol %) | Residual MA (mol %)*** | Comment |
|---|---|---|---|---|---|---|---|---|---|
| 68* | 6.4 | HEGCl | 0.2 upfront + 0.6/at 180° C. and after stoich. | 12 | (0.2 dose: 12 0.8 dose: 10.5 hours: | 16.5 | 0.15 | 0.02 | Monomers and 0.2% catalyst charged cold (room temperature),, then 0.6% catalyst charged after on stoichiometry. |
| 69* | 42 | HEGCl | 0.2 up front + 0.6/ at 180° C. and after stoich. | 5 | (0.2)>5 0.8<5 | 18.5 | 0.1 | 0.019 | 1 mol % PA added (based on moles of ClPA employed) |
| 70* | 8.4 | HEGCl | 0.2 upfront + 0.6/at 180° C. and after stoich. | 4 | (0.2): 4 0.6<3 hours | 20 | 0.06 | 0.073 | Melt ClPA addition to DDS at 160° C. with 0.2% catalyst, then 0.6% catalyst after on stoichiometry. |

*Comparative
**After Stoich. Correction
***Final Stoichiometry

It can be seen that the use of HEGCl as the imidization catalyst in comparative examples 65-70 afforded a DDS-ClPAMI with significantly less residual ClPA and less residual monoamine than when SPP was used as the catalyst (Comparative Example 59). More particularly, in Comparative Example 64, the residual ClPA and residual monoamine amounts were 1.26 and 0.84, respectively, when 0.5 mol % of the SPP was added at the start of the reaction (at room temperature). In Comparative Example 65, the residual ClPA and residual monoamine amounts were 0.41 and 0.17, respectively, when 1 mol % of the HEGCL was added at the start of the reaction (at room temperature). In Comparative Example 66, the residual ClPA and residual monoamine amounts were 0.24 and 0.03, respectively, when 0.2 mol % of the HEGCL was added at the start of the reaction (at room temperature). In Comparative Example 67, the residual ClPA and residual monoamine amounts were 0.26 and 0.078, respectively, when 0.2 mol % of the HEGCL was added approximately 1.5 hours when the reaction mixture had reached a temperature of 180° C. In Comparative Example 68, the residual ClPA and residual monoamine amounts were 0.15 and 0.02, respectively, when 0.2 mol % of the HEGCL was added at the start of the reaction (at room temperature) and 0.6 mol % of HEGCl were added approximately 1.5 hours when the reaction mixture had reached a temperature of 180° C. In Comparative Example 69, the residual ClPA and residual monoamine amounts were 0.1 and 0.019, respectively, when 0.2 mol % of the HEGCL was added at the start of the reaction (at room temperature) and 0.6 mol % of HEGCl were added approximately 1.5 hours when the reaction mixture had reached a temperature of 180° C. In Comparative Example 70, the residual ClPA and residual monoamine amounts were 0.06 and 0.073, respectively, when 0.2 mol % of the HEGCL was added after 30 minutes of the reaction (at 180° C.) and 0.6 mol % of HEGCl were added approximately 1.5 hours after the start of the reaction when the reaction mixture had reached a temperature of 180° C.

Comparative Examples 72 and 73

These examples show that the use of HEGCl as a catalyst for the imidization reaction to form DDS-ClPAMI, and subsequent polymerization of the DDS-ClPAMI, affords a lower PDI* (Mz/Mw) than when SPP is used as the imidization catalyst. Lower PDI* is indicative of a polymer that is less branched, and less prone to shear thinning behavior when under a stress.

Comparative Example 72

The purpose of this comparative example was to make a polyetherimide by using the same HEGCl during the imidization phase as well as the polymerization phase of the polyetherimide preparation process. A 1-liter 3-necked round-bottomed flask equipped with a mechanical stirrer, a nitrogen inlet and a Dean-Stark trap was charged at room temperature with 4,4'-diaminodiphenylsulfone (DDS) (42 gr, 169.15 mmol), 3-chlorophthalic anhydride (3-ClPA, 61.00 gr, 334.14 mmol), phthalic anhydride (PA, 616.2 mg, 4.163 mmol) and 500 mL of o-DCB. The flask was immersed in a hot oil bath and gradually heated to reflux with azeotropic removal of water. After the temperature reached 180° C., the reaction mixture was a clear solution and 80 mL of o-DCB have already distilled. About 90 mg HEGCl (17% solution in o-DCB) was added and the reaction was allowed to proceed with additional distillation of o-DCB (35 mL) at which point the intermediate monoamine (MA) was at a relatively low level that it could be accurately quantified by the HPLC method to give a correct analysis. In this case a 3-ClPA correction was made to put the stoichiometry at 0.1 mol % excess ClPA based on ClPA charge. Additional HEGCl catalyst (approx. 270 mg as a 17% o-DCB solution) was added and more o-DCB was distilled (55 mL) leaving the reaction at 18.5% solids (330 mL o-DCB in slurry). Internal reflux was maintained for 5 hours without additional removal of o-DCB. The residual monoamine (MA) and 3-ClPA were 0.019 and 0.102 mol % respectively.

To the bisimide slurry from the HEGCl catalyzed imidization described above in 330 mL o-DCB was added additional o-DCB (100 mL). The mixture was heated to distill 150 mL of solvent and dry the slurry before adding BPA disodium salt to initiate the polymerization. In a separate oven dried 500 mL, round-bottomed flask equipped with an overhead mechanical stirrer were placed 180 gr of a dry BPA disodium salt slurry (at 24.3% solids in o-DCB) and then diluted with 120 mL of dry o-DCB. The slurry was gently stirred under nitrogen and heated to distill 35 mL of o-DCB leaving a dry salt slurry at 14.8% solids. The dry slurry was cooled to approximately 170° C. and transferred under nitrogen pressure during 15 minutes through a high temperature Teflon tubing to the stirred bisimide slurry at 180° C. The BPA salt was rinsed with 20 mL of cold (room temperature) dry o-DCB and also transferred to the bisimide slurry. The combined bisimide-salt slurry was heated rapidly to start concentration and 267 mL of o-DCB were distilled off in 40 minutes to put the polymerization solution at about 30% solids based on the theoretical polymer weight. The polymerization was continued under total reflux and monitored by GPC for Mw measurement. The first plateau was achieved in 6 hours at a Mw of 36.95 KD after being at 30% solids. A salt slurry correction (4.0 gr., 24.3% solids) was made and Mw build plateaued again after 4 hours at 53.25 KD. Another salt correction with 0.6 gr of 24.3% slurry only increased Mw to 53.9 KD after 3 hours. The reaction was then quenched with 1.1 gr. of 85% aqueous phosphoric acid at 180° C. for 20 minutes. GPC on final quenched polymer showed an Mw=51.977 KD, Mn=22.597 KD, and Mz=78.162 KD (PDI=2.3; PDI*=1.503).

Comparative Example 73

A 250 mL, 3-necked round-bottomed flask equipped with a mechanical stirrer, a nitrogen inlet and a Dean-Stark trap was charged with 4,4'-diaminodiphenylsulfone (DDS) (6.4 gr, 25.775 mmol), 3-chlorophthalic anhydride (3-ClPA) or a mixture of 3-ClPA with up to 5% of 4-ClPA (9.411 gr, 51.551 mmol), sodium phenylphosphinate (SPP), (21.1 mg, 0.128 mmol, 0.5 mol % relative to DDS) and 100 mL of o-DCB. The flask was immersed in an oil bath and heated to reflux with azeotropic removal of water. After 40 mL of o-DCB was distilled the reaction solution remained as a clear solution and after a while the mixture turned into thick white slurry. The reaction was allowed to proceed to a point where the intermediate monoamine-imide (MA) was at a relatively low level that it could be completely quantified by the HPLC method to give a correct bisimide analysis. A 3-ClPA or DDS correction was made to put the stoichiometry at 0.25-0.3 mol % excess ClPA based on ClPA charge. At this point the contents of the flask were transferred to a Parr reactor, which was heated and maintained at 230° C. and about 25 psi while stirring by using a partial condenser and a pressure relief valve. The reactor was depressurized and cooled after 12-15 hours. HPLC analysis indicated residual MA and ClPA to be in spec.

The polymerization of this SPP-based high temperature/pressure imidization followed a similar procedure as described in comparative example 72, with one modification. After the imidization reactor was depressurized and cooled down, the required amount of HEGCl as a polymerization catalyst was added and the combined bisimide/HEGCl catalyst slurry was dried by distilling o-DCB to achieve 20 ppm water in the distillate. A BPA salt slurry was dried and added as in comparative Example 72 followed by concentration and polymerization to build Mw. Salt corrections were made as needed to achieve the target Mw: Mw=57.03 KD; Mn=21.669 KD and Mz=95.541 KD (PDI=2.68; PDI*=1.68).

The PDI* of the polyetherimide resulting from the use of HEGCl as the imidization catalyst was 1.503 (Comparative Example 72), while the PDI* of the polymer resulting from the use of SPP as the imidization catalyst was 1.68 (comparative Example 73). A higher PDI* (Mz/Mw) indicates a polymer that is more branched. A branched polymer behaves rheologically different than a less branched or unbranched polymer when molded. These differences can negatively affect molding cycle times. Branched polymers can become non-processable if they were to branch slightly more. For example, when a branched polymer is molded at a slightly higher than normal temperature, then more branching of the polymer can occur during molding, resulting in a cross-liked part with decreased tensile strength and impact resistance.

Comparative Examples 74-85

These comparative examples show that HEGCl can be used as an imidization catalyst in the displacement process when added at the beginning of the imidization reaction or near the end of the reaction. ClPAMI was prepared as described for Comparative Examples 6-18, except that HEGCl was added to the reaction vessel at the times indicated in Table 12. Table 12 shows the time at which the HEGCl was added to the reaction mixture, the total reaction time for each reaction, the amount of time that the HEGCl was in the reaction, the mol % of residual ClPA and the mol % of residual monoamine at the end of the reaction, and the overall stoichiometry of the ClPAMI at the end of reaction. A positive stoichiometry indicates excess ClPA present in the ClPAMI, and a negative stoichiometry indicates an excess of monoamine present in the ClPAMI.

TABLE 12

| Ex. No. | HEGCl (mol %)* | Time HEGCl added to the Reaction (hour) | Total Reaction Time (hour) | Time HEGCl with ClPAMI (hour) | mol % Residual ClPA | mol % Residual Monoamine | ClPAMI Stoichiometry (mol %) |
|---|---|---|---|---|---|---|---|
| 74 | 0.05 | 3 | 15 | 12 | 0.27 | 0.05 | 0.22 |
| 75 | 0.1 | 3 | 10 | 7 | 0.17 | 0.04 | 0.13 |
| 76 | 0.1 | 2 | 6 | 4 | 0.24 | 0.03 | 0.21 |
| 77 | 0.1 | 2 | 10 | 8 | 0.17 | 0.01 | 0.16 |
| 78 | 0.2 | 5 | 8 | 3 | 0.08 | 0.15 | −0.07 |
| 79 | 0.2 | 8 | 11 | 3 | 0.20 | 0.02 | 0.18 |
| 80 | 0.2 | 1 | 4 | 3 | 0.23 | 0.02 | 0.21 |
| 81 | 1 | 1 | 3 | 2 | 0.02 | 0.02 | 0.00 |
| 82 | 1 | 0 | 5 | 5 | 0.00 | 0.04 | −0.04 |
| 83 | 1 | 0 | 6 | 6 | 0.03 | 0.02 | 0.01 |
| 84 | 1 | 8 | 10 | 2 | 0.19 | 0.02 | 0.17 |
| 85 | 1 | 8 | 10 | 2 | 0.20 | 0.04 | 0.17 |

*Based on amount of m-PD

Comparative Example 74 shows that 0.05 mol % HEGCl, with respect to the amount of mPD employed in the reaction, when added 3 hours into the reaction, gave a ClPAMI with very low residual monoamine (0.05 mol %) after 15 hours of reaction time, with an acceptable final ClPAMI stoichiometry. This material is suitable for the displacement polymerization reaction with bisphenol A disodium salt.

Comparative Example 76 shows that 0.1 mol % HEGCl, with respect to the amount of mPD employed in the reaction, when added 2 hours into the reaction, gave a ClPAMI with very low residual monoamine (0.03 mol %) after 15 hours of reaction time, with an acceptable final ClPAMI stoichiometry. This material is suitable for the polymerization reaction with bisphenol A disodium salt.

Comparative Example 80 shows that 0.2 mol % HEGCl, with respect to the amount of mPD employed in the reaction, when added 1 hours into the reaction, gave a ClPAMI with very low residual monoamine (0.02 mol %) after 4 hours of reaction time, with an acceptable final ClPAMI stoichiometry. This material is suitable for the polymerization reaction with bisphenol A disodium salt.

Comparative Example 82 shows that 1 mol % HEGCl, with respect to the amount of mPD employed in the reaction, when added at the beginning of the reaction, gave a ClPAMI with very low residual monoamine (0.04 mol %) after 5 hours of reaction time, with an acceptable final ClPAMI stoichiometry. This material is suitable for the polymerization reaction with bisphenol A disodium salt.

Comparative Example 84 shows that 1 mol % HEGCl, with respect to the amount of mPD employed in the reaction, when added 8 hours into the reaction, gave a ClPAMI with very low residual monoamine (0.02 mol %) after 10 hours of reaction time, with an acceptable final ClPAMI stoichiometry. This material is suitable for the polymerization reaction with bisphenol A disodium salt.

All the comparative examples shown in Table 12 demonstrate that HEGCl can be added at the beginning of the imidization reaction or near the end of the reaction, in an amount of 0.1 mol % HEGCl to 1.0 mol % HEGCl (with respect to the moles of mPD employed in the reaction), and afford a finished ClPAMI with low residual ClPA and monoamine, suitable for polymerization with bisphenol A disodium salt. Though not shown in Table 12, it was found that the more catalyst that was used, the faster the imidization reaction was completed. Completion of the imidization reaction is defined as affording a ClPAMI with residual monoamine of less than 0.10 mol % and the overall stoichiometry is less than 0.30 mol %.

Comparative Examples 86-88

Comparative Example 86

Figure 2:
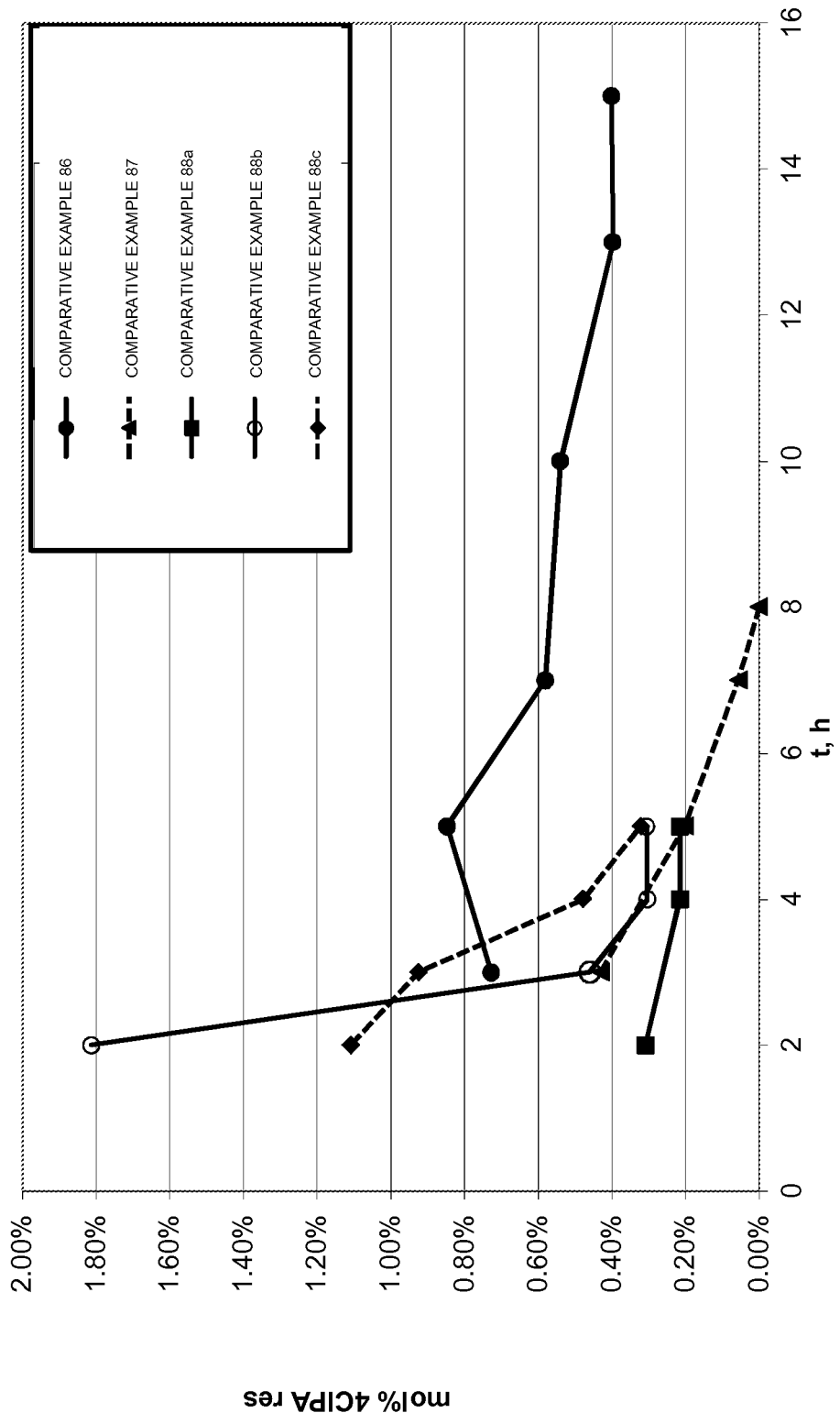
FIG. 2 is a graph showing the amount of residual 4-ClPA as a function of reaction times for uncatalyzed and HEGCl catalyzed bis(chlorophthalimide) monomer making reactions.

ClPAMI was prepared as slurry in o-DCB by condensing of 4-ClPA and m-phenylene diamine ("mPD") in o-DCB with azeotropic removal of water. A slight excess of 4-ClPA (about 0.2 mol %) was used. The reaction temperature was initially 100° C. and ramped slowly to 150° C., 180° C., and then 200° C. The o-DCB was removed from the mixture until it reached 20 to 50 wt % solids. No imidization catalyst was present. After 14 to 15 hours, the amount of residual 4-ClPA was 0.4 mol %, and the amount of residual mPD was 0.11 mol %. The amount of 4-ClPA as a function of reaction time is provided in FIG. 2 (curve Comparative Example 86). This curve represents a typical reaction profile when ClPAMI is made without an imidization catalyst. Due to second order kinetics of the reaction, at the low levels of unreacted ClPAMI and mPD present after 14-15 hours, the reaction substantially stops.

Comparative Example 87

The same procedure as Comparative Example 86 was followed, except about 2 mol % excess mPD was used. The imidization was complete in about 8 hours, when all the 4-ClPA was consumed. The amount of 4-ClPA as a function of reaction time is provided in FIG. 2 (curve Comparative Example 87). Thus, use of excess mPD is an effective way to achieve a commercially viable reaction time. Since it has been observed that when mPD is used in excess, the use of the resulting imidized product results in crosslinked polymer (ordinarily an undesired results), the resulting amine end groups in the polyetherimide formed by polymerization of the 4-ClPAMI so made should be capped, which can be a disadvantage unless amine end groups are desired.

Comparative Example 88a

The same procedure as Comparative Example 86 was followed, except that equimolar amounts of ClPAMI and mPD were used, and 0.18 mol % of ALIQUAT® HTA-1 was used as an imidization catalyst at the beginning of the reaction. ALIQUAT® HTA-1 is hexaethylguanidinium chloride ("HEGCl"). The imidization went to completion within 3 hours. The amount of 4-ClPA as a function of reaction time is provided in FIG. 2 as curve Comparative Example 88a.

Comparative Example 88b

The same procedure as Comparative Example 86 was followed, except that equimolar amounts of ClPAMI and mPD were used, and 0.18 mol % of ALIQUAT® HTA-1 was used as an imidization catalyst and added 2 hours into the reaction. ALIQUAT® HTA-1 is hexaethylguanidinium chloride ("HEGCl"). The amount of 4-ClPA as a function of reaction time is provided in FIG. 2 as curve Comparative Example 88b.

Comparative Example 88c

The same procedure as Comparative Example 86 was followed, except that equimolar amounts of ClPAMI and mPD were used, and 0.18 mol % of ALIQUAT® HTA-1 was used as an imidization catalyst as added 3 hours into the reaction. ALIQUAT® HTA-1 is hexaethylguanidinium chloride ("HEGCl). The amount of 4-ClPA as a function of reaction time is provided in FIG. 2 as curve Comparative Example 88c.

Comparative Examples 89-91

Stoichiometric correction is a procedure in which the amounts of residual reactants during a reaction, and the stoichiometry of the reactants are adjusted by adding additional reactant, e.g., additional 4-ClPA or mPD, for the imidization reaction. The inventors hereof have found that the stoichiometric correction procedure can also be used when an imidization catalyst is present.

Comparative Example 89

Figure 3:
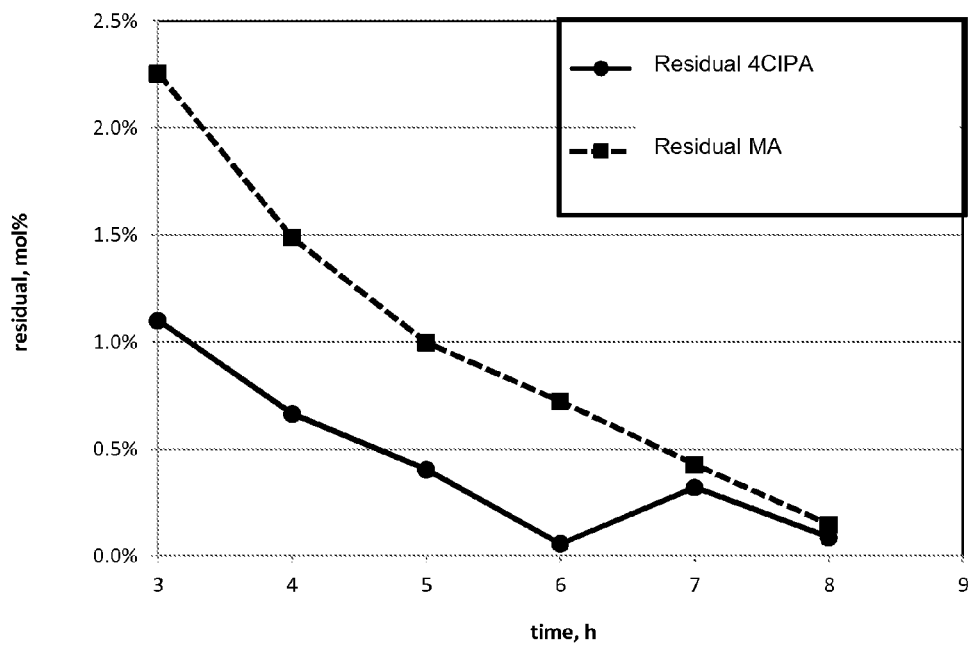
FIG. 3 is a graph showing the amount of residual 4-ClPA and MA as a function of reaction times for HEGCl catalyzed bis(chlorophthalimide) monomer making reactions.

The same procedure as Comparative Example 86 was followed, except 0.20 mol % of HEGCl was added 5 hours into the imidization reaction. The moisture content of the o-DCB distillate at this stage was less than 50 ppm. (However, the HEGCl is also effective as a catalyst at higher moisture contents.) Determination of the molar ratio of residual mPD to 4-ClPA 6 hours into the reaction indicated a deficit of 4-ClPA. Fresh 4-ClPA was added. As indicated by FIG. 3, the imidization proceeded to very low levels of residual 4-ClPA after 8 hours from the start of the imidization and only 3 hours after addition of HEGCl. It is notable that stoichiometric correction was possible even in the presence of HEGCl. This is an important technical feature because this provides both a way to complete the imidization in a commercially viable time without using an excess of either reactant, while maintaining the ability to make adjustments during the imidization. Final residuals were: r4ClPA=0.08; rMA=0.14 at 99.71% conversion.

Figure 4:
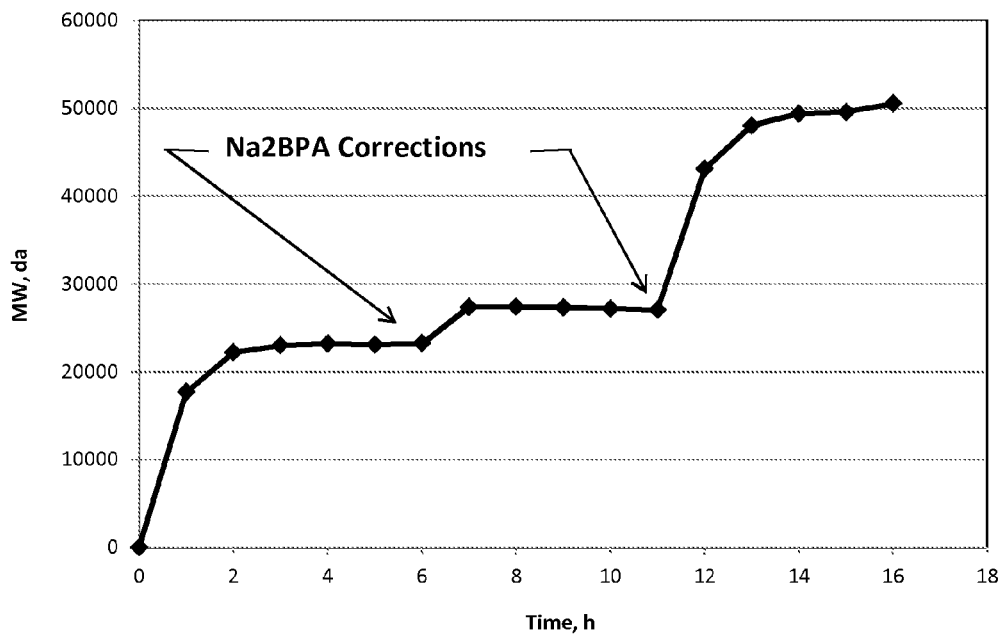
FIG. 4 is a graph of Mw vs. polymerization time for displacement polymerizations.

Additional HEGCl (0.8 mole %) was added to the ClPAMI, the reaction mixture was dried by azeotropic distillation, and a slurry of bisphenol A disodium salt ("BPA.Na$_2$") in o-DCB was added. A plot of Mw vs. polymerization time showed that the polymerization was complete, as defined by reaching a molecular weight of about 50,000 g/mole, after 16 hour (FIG. 4).

This example shows that ClPAMI produced by the inventive process is suitable for the production of polyetherimide.

Comparative Example 90

Figure 5:
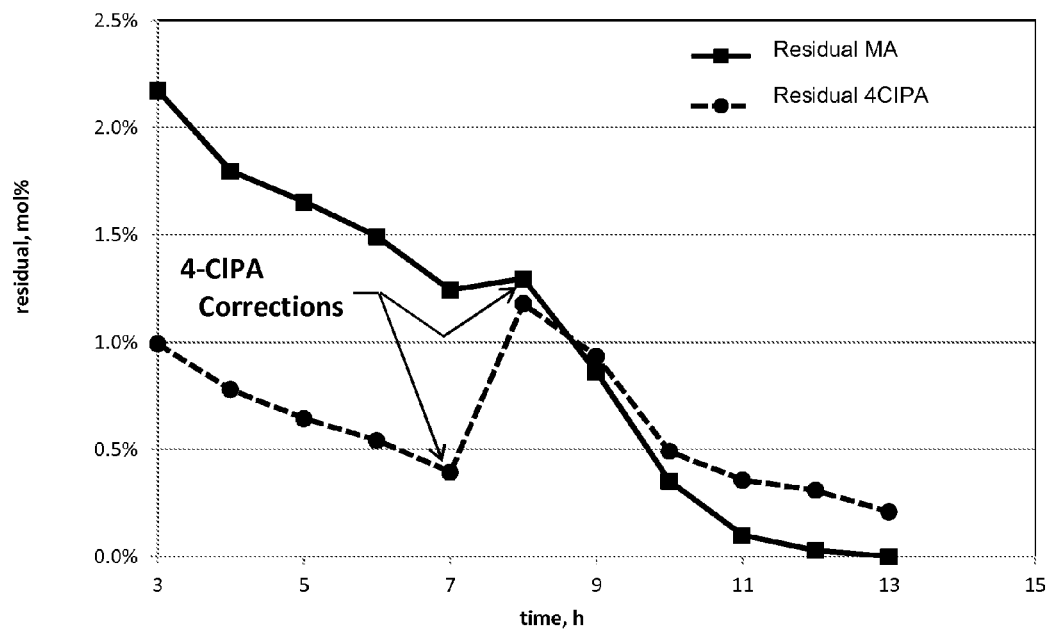
FIG. 5 is a graph showing the amount of residual 4-ClPA and MA as a function of reaction times for HEGCl catalyzed bis(chlorophthalimide) monomer making reactions.
Figure 6:
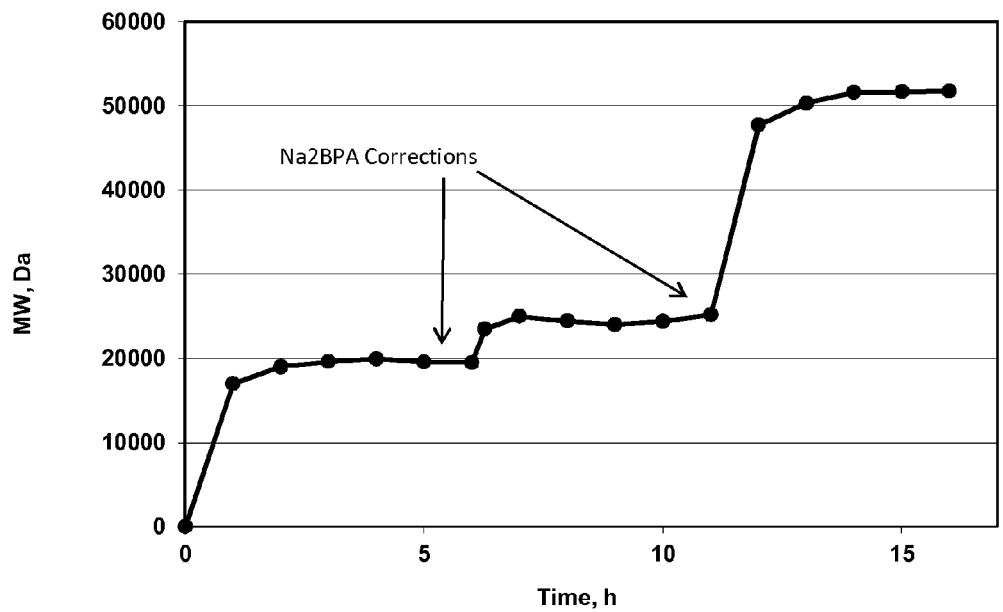
FIG. 6 is a graph of Mw as a function of polymerization time for displacement polymerizations.

The procedure of Comparative Example 89 was followed for both ClPAMI and polymerization, except that the molar ratio of residual mPD to 4-ClPA was determined and 4ClPA made corrections at both 7$^{th}$ and 8$^{th}$ hour and 0.2 HEGCl was added at 9.5$^{th}$ hour. Similar results were obtained. The imidization to produce ClPAMI was complete 13 hours from the start and 3.5 hours from the addition of HEGCl. Final residual of rClPA was 0.21 and the final residual of rMA was not determined. The reaction profiles of the imidization reaction and the polymerization reaction are provided in FIGS. 5 and 6, respectively.

Comparative Example 91

Figure 7:
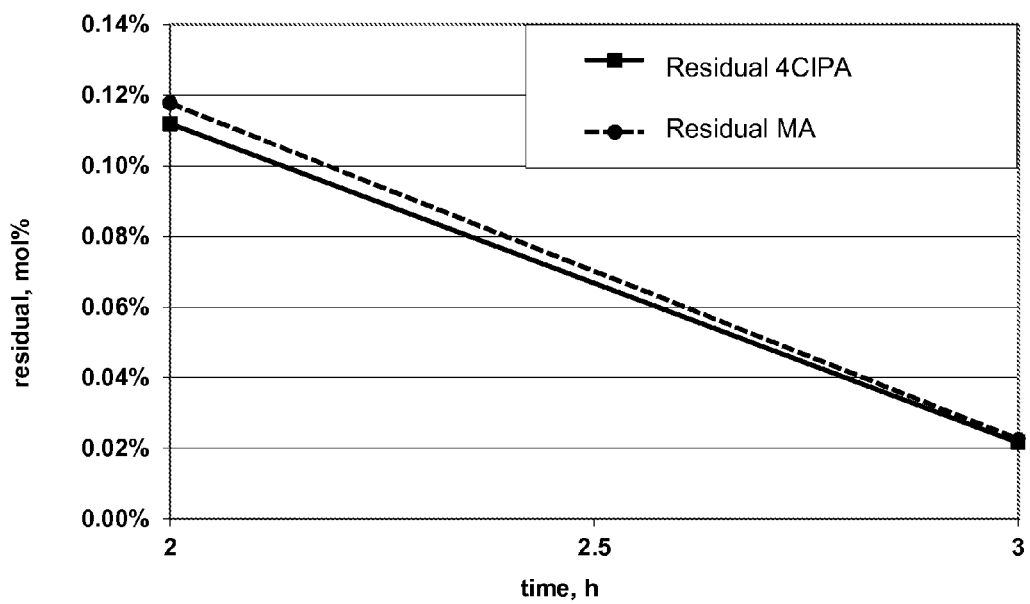
FIG. 7 is a graph showing the amount of residual 4-ClPA and MA as a function of reaction times for HEGCl catalyzed bis(chlorophthalimide) monomer making reactions.
Figure 8:
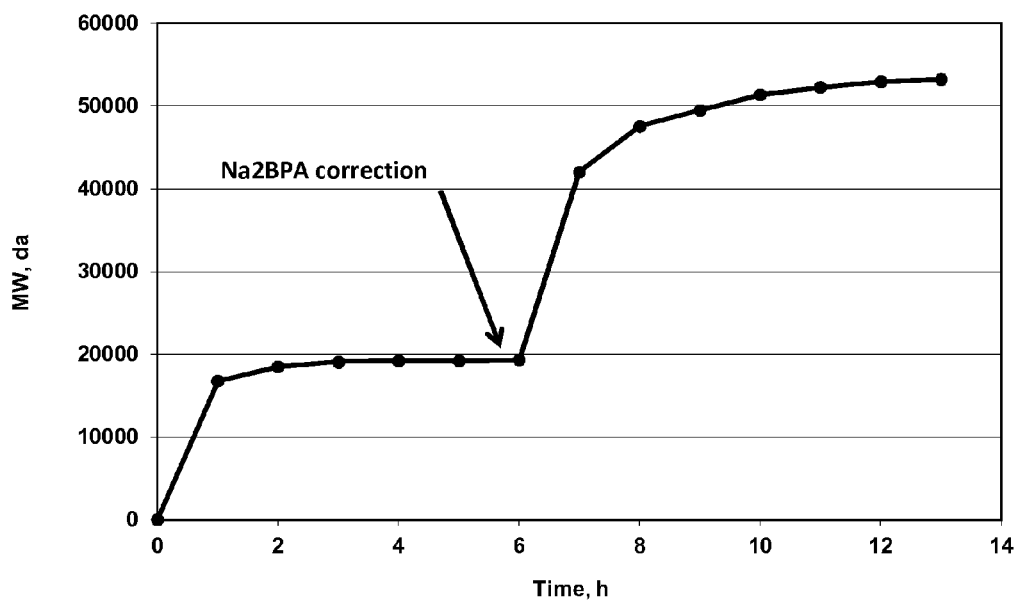
FIG. 8 is a graph of Mw as a function of polymerization times for displacement polymerizations.

The same procedure as Comparative Example 89 was followed, except
1 mol % HEGCl was used as the imidization catalyst instead of 0.18 mol %, and the HEGCl was added at the beginning of the imidization reaction, instead of 5 hours into the imidization reaction. The imidization reaction was substantially complete after only 3 hours and no stoichiometric adjustment was necessary (FIG. 7). This short imidization reaction time indicates the effectiveness of HEGCl as an imidization catalyst. After addition of BPA.Na$_2$ slurry in o-DCB, polymerization was complete in 13 hours. (FIG. 8) The Example demonstrates that when 1 mol % of HEGCl is added up front to catalyze the imidization, not only is the rate of ClPAMI formation accelerated, but polymerization takes place at an acceptable rate without additional polymerization catalyst. All patents and references cited herein are incorporated by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method for the manufacture of a polyetherimide composition, the method comprising catalyzing the reaction of a dianhydride and an organic diamine with a guanidinium salt catalyst, optionally in the presence of a solvent, to provide the polyetherimide composition comprising a residue of the catalyst and a polyetherimide;
wherein
the dianhydride has the formula

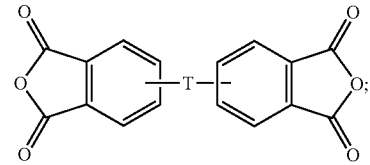

the diamine has the formula

and the polyetherimide has the formula

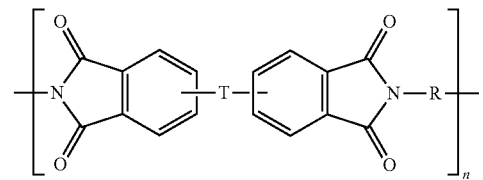

wherein in the forgoing formulae:
T is —O— or a group of the formula —O—Z—O—, wherein Z is an aromatic C$_{6-24}$ monocyclic or polycyclic moiety optionally substituted with 1 to 6 C$_{1-8}$ alkyl groups, 1 to 8 halogen atoms, or a combination thereof;
R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, a divalent group of the formula

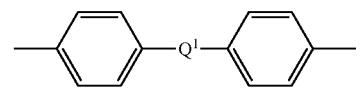

wherein Q$^1$ is selected from —O—, —S—, —C(O)—, —SO$_2$—, —SO—, and —C$_y$H$_{2y}$— and a halogenated derivative thereof wherein y is an integer from 1 to 5, and —(C$_6$H$_{10}$)$_z$— wherein z is an integer from 1 to 4, and an aromatic hydrocarbyl moiety having from 1 to 6 aromatic groups; and
n is an integer greater than 1;
wherein the catalyst is present in an amount of 0.01 to 2 mole %, based on the moles of the diamine.

2. The method of claim 1, wherein the reaction of the dianhydride and the diamine is complete in less than or equal to 20 hours.

3. The method of claim 1, comprising combining the dianhydride, the organic diamine, the catalyst, and optionally the solvent before heating the combination.

4. The method of claim 1, wherein the reaction is conducted under melt polymerization conditions.

5. The method of claim 1, wherein the reaction is conducted under solution polymerization conditions.

6. The method of claim 1, wherein the reaction is conducted in the further presence of an endcapping agent.

7. The method of claim 6, wherein the endcapping agent is phthalic anhydride, aniline, a C1-C18 linear, branched or cyclic aliphatic monoamine or a monofunctional aromatic amine.

8. The method of claim 1, wherein the molar ratio of the dianhydride to the organic diamine is 0.9:1 to 1.5:1.

9. The method of claim 1, wherein the catalyst is present in an amount of 0.2 to 1.0 mole percent, based on the moles of the organic diamine.

10. The method of claim 1, wherein the catalyst is present in an amount of 0.1 to 1 mole %, based on the moles of the organic diamine.

11. The method of claim 1, wherein the catalyst is hexaethylguanidinium chloride.

12. The method of claim 1, wherein the catalyst is a guanidinium salt, and a residue of the guanidinium salt is present in the polyetherimide composition in an amount less than 1000 ppm, based on parts by weight of the polyetherimide composition.

13. The method of claim 1, wherein the polyetherimide composition comprises less than 100 ppm of a sodium aryl phosphinate salt, based on the weight of the polyetherimide composition.

14. The method of claim 13, wherein the polyetherimide composition comprises no detectable amount of the sodium aryl phosphinate salt.

15. The method of claim 1, wherein

R is a divalent radical of the formula —$(C_6H_{10})_z$— wherein z is an integer from 1 to 4,

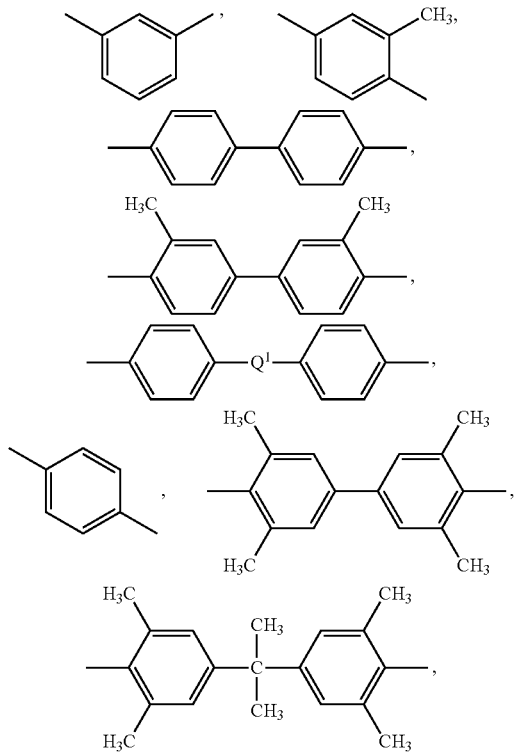

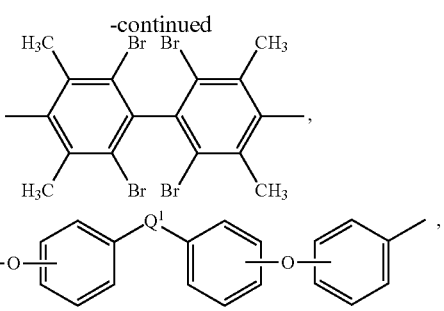

and combinations thereof, wherein $Q^1$ is selected from a single bond, —O—, —S—, —C(O)—, —$SO_2$—, —SO—, —$C_yH_{2y}$— wherein y is an integer from 1 to 5, and combinations thereof; and Z is a divalent group of formula

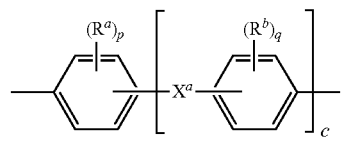

wherein $R^a$ and $R^b$ are each a halogen atom or a monovalent hydrocarbon group and can be the same or different;

$X^a$ is a single bond, —O—, —S—, —S(O)—, —$S(O)_2$—, —C(O)—, or a $C_{1-18}$ organic group;

p and q are each independently integers of 0 to 4; and c is 0 or 1.

16. The method of claim 1, wherein

Z is 2,2-(4-phenylene)isopropylidene, and

R is m-phenylene, p-phenylene, diarylsulfone, or a group of the formula

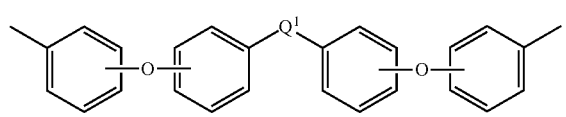

wherein $Q^1$ is —is a member selected from the group of a single bond, —O—, —S—, —C(O)—, —$SO_2$—, —SO—, —$C_yH_{2y}$, wherein y is an integer from 1 to 5, and combinations thereof.

17. A method for the manufacture of a polyetherimide composition, the method comprising catalyzing the reaction of a dianhydride and an organic diamine with a guanidinium salt catalyst, optionally in the presence of a solvent, to provide the polyetherimide composition comprising a residue of the catalyst and a polyetherimide;

wherein the dianhydride has a formula of

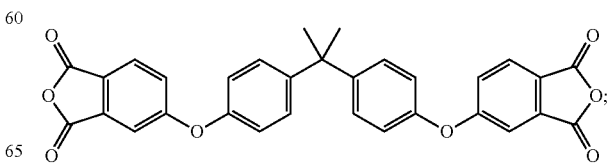

the diamine has a formula of

H₂N—R—NH₂; and the polyetherimide has a formula of

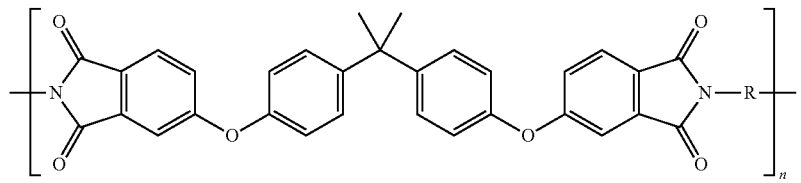

wherein in the forgoing formulae:
R is selected from

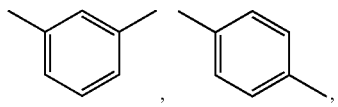

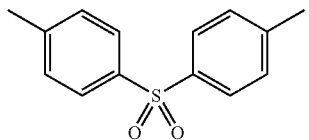

and combinations thereof; and
n is an integer greater than 1;
wherein the reaction of the dianhydride and the diamine is complete in less than or equal to 20 hours; and
wherein the catalyst is present in an amount of 0.01 to 2 mole %, based on the moles of the diamine.

18. The method of claim 17, wherein the reaction is conducted under melt polymerization conditions.

19. The method of claim 17, wherein the reaction is conducted under solution polymerization conditions.

20. The method of claim 17, wherein the reaction is conducted in the further presence of an endcapping agent.

21. The method of claim 20, wherein the endcapping agent is phthalic anhydride, aniline, a C1-C18 linear, branched or cyclic aliphatic monoamine, or a monofunctional aromatic amine.

22. The method of claim 17, wherein the molar ratio of the dianhydride to the organic diamine is 0.9:1 to 1.5:1.

23. The method of claim 17, wherein the catalyst is present in an amount of 0.2 to 1.0 mole percent, based on the moles of the organic diamine.

24. The method of claim 17, wherein the catalyst is present in an amount of 0.1 to 1 mole %, based on the moles of the organic diamine.

25. The method of claim 17, wherein the catalyst is hexaethylguanidinium chloride.

26. A composition comprising
a guanidinium salt catalyst;
a dianhydride having a formula of

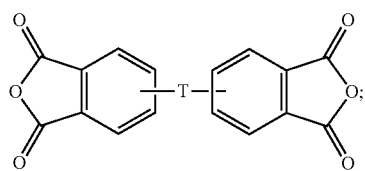

and
a diamine having a formula of

H₂N—R—NH₂ wherein in the forgoing formulae:
T is —O— or a group of the formula —O—Z—O—, wherein Z is an aromatic $C_{6-24}$ monocyclic or polycyclic moiety optionally substituted with 1 to 6 $C_{1-8}$ alkyl groups, 1 to 8 halogen atoms, or a combination thereof; and R is selected from an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, a divalent group of the formula

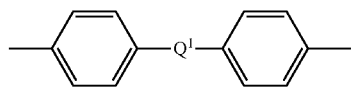

wherein $Q^1$ is selected from —O—, —S—, —C(O)—, —SO₂—, —SO—, and —$C_yH_{2y}$— and a halogenated derivative thereof wherein y is an integer from 1 to 5, and —$(C_6H_{10})_z$— wherein z is an integer from 1 to 4, and an aromatic hydrocarbyl moiety having from 1 to 6 aromatic groups;
wherein the catalyst is present in an amount of 0.01 to 2 mole %, based on the moles of the diamine.

27. The composition of claim 26, further comprising an endcapping agent.

* * * * *